(12) United States Patent
Gupte et al.

(10) Patent No.: US 11,769,258 B2
(45) Date of Patent: Sep. 26, 2023

(54) FEATURE PROCESSING IN EXTENDED REALITY SYSTEMS

(71) Applicant: QUALCOMM Incorporated, San Diego, CA (US)

(72) Inventors: Ajit Deepak Gupte, Bangalore (IN); Gerhard Reitmayr, Del Mar, CA (US); Abhijeet Bisain, San Diego, CA (US); Pushkar Gorur Sheshagiri, Bengaluru (IN); Chayan Sharma, Tabalpur (IN); Ajit Venkat Rao, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 17/166,957

(22) Filed: Feb. 3, 2021

(65) Prior Publication Data

US 2022/0245832 A1 Aug. 4, 2022

(51) Int. Cl.
*G06T 7/246* (2017.01)
*G06T 7/73* (2017.01)
*G06T 7/292* (2017.01)
*G06F 3/01* (2006.01)

(52) U.S. Cl.
CPC .............. *G06T 7/248* (2017.01); *G06T 7/292* (2017.01); *G06T 7/74* (2017.01); *G06F 3/012* (2013.01); *G06T 2207/10012* (2013.01); *G06T 2207/10032* (2013.01); *G06T 2207/30244* (2013.01); *G06T 2207/30252* (2013.01)

(58) Field of Classification Search
CPC ............. G06T 7/243; G06T 7/292; G06T 2207/10012; G06T 2207/30244; G06T 7/248
See application file for complete search history.

(56) References Cited

U.S. PATENT DOCUMENTS

2017/0046594 A1* 2/2017 Nerurkar ............... G06F 16/583

* cited by examiner

*Primary Examiner* — Myron Wyche
(74) *Attorney, Agent, or Firm* — QUALCOMM Incorporated

(57) ABSTRACT

Systems and techniques are described herein for processing images. The systems and techniques can be implemented by various types of systems, such as by an extended reality (XR) system or device. In some cases, a first processor receives an image of an environment captured by an image sensor, identifies features depicted in the image, and generates descriptors for the features. The first processor sends the descriptors to a second processor, which may be more powerful than the first processor. The second processor receives the descriptors. The second processor associates the plurality of features with a map of the environment based on at least a subset of the plurality of descriptors. For example, the second processor can track at least a subset of the features based on at least a subset of the descriptors and based on feature information from one or more additional images of the environment.

30 Claims, 12 Drawing Sheets

FEATURE PROCESSING IN EXTENDED REALITY SYSTEMS

FIELD

This application is related to image processing. More specifically, aspects of the application relate to systems and techniques of dividing operations supporting feature extraction, tracking, localization, mapping, and/or pose estimation among multiple processors to optimize use of power, bandwidth, and computational resources.

BACKGROUND

Degrees of freedom (DoF) refer to the number of basic ways a rigid object can move through three-dimensional (3D) space. In some examples, six different DoF can be tracked. The six DoF include three translational DoF corresponding to translational movement along three perpendicular axes, which can be referred to as x, y, and z axes. The six DoF include three rotational DoF corresponding to rotational movement around the three axes, which can be referred to as pitch, yaw, and roll. Some extended reality (XR) devices, such as virtual reality (VR) or augmented reality (AR) headsets, can track some or all of these degrees of freedom. For instance, a 3DoF XR headset typically tracks the three rotational DoF, and can therefore track whether a user turns and/or tilts their head. A 6DoF XR headset tracks all six DoF, and thus also tracks a user's translational movements.

XR devices typically use powerful processors to perform feature analysis (e.g., extraction, tracking, etc.) and other complex functions quickly enough to display an output based on those functions to their users. Powerful processors generally draw power at a high rate. Similarly, sending large quantities of data to a powerful processor typically draws power at a high rate. Headsets and other portable devices typically have small batteries so as not to be uncomfortably heavy to users. Thus, some XR devices must be plugged into an external power source, and are thus not portable. Portable XR devices generally have short battery lives and/or are uncomfortably heavy due to inclusion of large batteries.

SUMMARY

Systems and techniques are described herein for processing images. In some cases, a system or device can divide image processing operations among multiple processors to optimize use of power, data bandwidth, and other computational resources. For instance, the image processing operations can support 3-degrees of freedom (3DoF) tracking, 6-degrees of freedom (6DoF) tracking, and/or simultaneous localization and mapping (SLAM). In some examples, the system or device can include a first, low-power processor. The first processor can receive an image of an environment captured by an image sensor. The first processor cab identify features depicted in the image and can generate descriptors for the features. The first processor can send the descriptors to a second processor. The second processor may be more powerful than the first processor and/or may use power at a higher rate than the first processor. The second processor can receive the descriptors for the features from the first processor. The second processor can track at least some of the features based on at least some of the descriptors and based on feature information from one or more additional images of the environment. The feature information from the one or more additional images of the environment can, for example, include other descriptors for at least some of the features as depicted in the one or more additional images. The other descriptors can also be generated by the first processor based on the one or more additional images.

In one example, an apparatus for image processing is provided. The apparatus includes a memory, a first set of one or more processors (e.g., implemented in circuitry) coupled to the memory, and a second set of one or more processors (e.g., implemented in circuitry) coupled to the memory. The first set of one or more processors are configured to and can: identify a plurality of features depicted in an image of an environment captured by an image sensor; generate a plurality of descriptors corresponding to the plurality of features; and send the plurality of descriptors to a second set of one or more processors. The second set of one or more processors are configured to and can: receive the plurality of descriptors from the first set of one or more processors; and associate the plurality of features with a map of the environment based on at least a subset of the plurality of descriptors.

In another example, a method of image processing is provided. The method includes receiving image data captured by an image sensor. The method includes receiving, by a first set of one or more processors, an image of an environment captured by an image sensor. The method includes identifying, by the first set of one or more processors, a plurality of features depicted in the image. The method includes generating, by the first set of one or more processors, a plurality of descriptors corresponding to the plurality of features. The method includes sending the plurality of descriptors from the first set of one or more processors to a second set of one or more processors. The method includes receiving, by the second set of one or more processors, the plurality of descriptors from the first set of one or more processors. The method includes associating, by the second set of one or more processors, the plurality of features with a map of the environment based on at least a subset of the plurality of descriptors.

In another example, a non-transitory computer-readable medium is provided that has stored thereon instructions that, when executed by one or more processors, cause the one or more processors to: identify a plurality of features depicted in an image of an environment captured by an image sensor; generate a plurality of descriptors corresponding to the plurality of features; and send the plurality of descriptors; receive the plurality of descriptors; and associate the plurality of features with a map of the environment based on at least a subset of the plurality of descriptors.

In another example, an apparatus for image processing is provided. The apparatus includes means for receiving, at a first set of one or more processors, an image of an environment captured by an image sensor. The apparatus includes means for identifying a plurality of features depicted in the image. The apparatus includes means for generating a plurality of descriptors corresponding to the plurality of features. The apparatus includes means for sending the plurality of descriptors. The apparatus includes means for receiving the plurality of descriptors. The apparatus includes means for associating the plurality of features with a map of the environment based on at least a subset of the plurality of descriptors.

In some aspects, to associate the plurality of features with the map of the environment, the second set of one or more processors are configured to track at least a subset of the plurality of features based on at least the subset of the plurality of descriptors and feature information corresponding to one or more additional images of the environment. In some aspects, the feature information corresponding to the one or more additional images of the environment includes one or more other descriptors for at least the subset of the plurality of features, the one or more other descriptors based on one or more depictions of at least the subset of the plurality of features in the one or more additional images. In some aspects, the first set of one or more processors are configured to generate at least one of the one or more other descriptors in response to receipt of at least one of the one or more additional images.

In some aspects, the first set of one or more processors are configured to: identify feature locations of the plurality of features; and send the feature locations to the second set of one or more processors, wherein the second set of one or more processors are configured to receive the feature locations from the first set of one or more processors. In some aspects, to associate the plurality of features with the map of the environment, the second set of one or more processors are configured to associate the plurality of features with the map of the environment based on the feature locations. In some aspects, the plurality of features includes a first feature, wherein the second set of one or more processors are configured to generate a predicted location of the first feature based on one or more additional images that depict the first feature and send the predicted location of the first feature to the first set of one or more processors, wherein, to identify the feature locations, the first set of one or more processors are configured to identify a first feature location of the first feature based on the predicted location of the first feature.

In some aspects, the plurality of features includes a first feature, wherein the second set of one or more processors are configured to identify a predicted location of the first feature based on one or more stored descriptors corresponding to the first feature stored in the map of the environment and send the predicted location of the first feature to the first set of one or more processors, wherein, to identify the feature locations, the first set of one or more processors are configured to identify a first feature location of the first feature based on the predicted location of the first feature. In some aspects, the plurality of features includes a first feature, wherein the second set of one or more processors are configured to send a first feature descriptor of the first feature to the first set of one or more processors, the first feature descriptor based on another image depicting the first feature, and wherein, to identify the feature locations, the first set of one or more processors are configured to identify a first feature location of the first feature based on the first feature descriptor of the first feature.

In some aspects, the plurality of descriptors include one or more descriptors of a first descriptor type of a plurality of descriptor types based on the image being a keyframe, the first descriptor type having a higher complexity than at least a second descriptor type of the plurality of descriptor types. Ins some aspects, to associate the plurality of features with the map of the environment, the second set of one or more processors are configured to perform relocalization based on the one or more descriptors of the first descriptor type.

In some aspects, the plurality of descriptors are of a second descriptor type of a plurality of descriptor types based on the image not being a keyframe, the second descriptor type having a lower complexity than at least a first descriptor type of the plurality of descriptor types. In some aspects, to associate the plurality of features with the map of the environment, the second set of one or more processors are configured to perform feature tracking based on the plurality of descriptors of the second descriptor type.

In some aspects, to associate the plurality of features with the map of the environment, the second set of one or more processors are configured to: determine a location of a first feature of the plurality of features in the environment based on tracking at least the subset of the plurality of features; and update the map of the environment based on the location of the first feature. In some aspects, to update the map of the environment based on the location of the first feature, the second set of one or more processors are configured to add the location of the first feature to the map. In some aspects, to update the map of the environment based on the location of the first feature, the second set of one or more processors are configured to modify a prior location of the first feature in the map based on the location of the first feature.

In some aspects, the second set of one or more processors are configured to: determine a pose of the apparatus within the environment based on associating the plurality of features with a map of the environment, wherein the pose of the apparatus within the environment includes at least one of a location of the apparatus, a pitch of the apparatus, a roll of the apparatus, and a yaw of the apparatus. In some aspects, the second set of one or more processors are configured to: determine a pose of the image sensor within the environment based on associating the plurality of features with a map of the environment, wherein the pose of the image sensor within the environment includes at least one of a location of the image sensor, a pitch of the image sensor, a roll of the image sensor, and a yaw of the image sensor.

In some aspects, the first set of one or more processors are configured to: receive a second image of the environment captured by a second image sensor contemporaneously with capture of the image by the image sensor; identify a second plurality of features depicted in the second image; generate a second plurality of descriptors corresponding to the second plurality of features; and send the second plurality of descriptors to the second set of one or more processors; wherein the second set of one or more processors are configured to: receive the second plurality of descriptors from the first set of one or more processors; and perform stereo matching based on the plurality of descriptors and the second plurality of descriptors.

In some aspects, the second set of one or more processors are configured to: store a second subset of the plurality of descriptors for a second subset of the plurality of features based on the second subset of the plurality of descriptors representing a different observation viewpoint of the second subset of the plurality of features than any prior stored observation viewpoint of the second subset of the plurality of features; and delete a remainder of the plurality of descriptors other than the second subset of the plurality of descriptors.

In some aspects, the second set of one or more processors are configured to: identify a plurality of feature-specific descriptors for a first feature of the plurality of features, wherein the plurality of descriptors includes one of the plurality of feature-specific descriptors for the first feature; and determine a mean descriptor of the first feature based on a mean of the plurality of feature-specific descriptors for the first feature.

In some aspects, the second set of one or more processors have a higher average clock speed than the first set of one or more processors. In some aspects, the second set of one or more processors uses power at a higher rate than the first set of one or more processors.

In some aspects, the apparatus includes the image sensor. In some aspects, the apparatus includes the second set of one or more processors.

In some aspects, to send the plurality of descriptors to the second set of one or more processors, the first set of one or more processors sends the plurality of descriptors to the second set of one or more processors over a wireless connection. In some aspects, to receive the plurality of descriptors from the first set of one or more processors, the second set of one or more processors receive the plurality of descriptors from the first set of one or more processors over the wireless connection. In some aspects, to send the plurality of descriptors to the second set of one or more processors, the first set of one or more processors sends the plurality of descriptors to the second set of one or more processors over an electrical connection. In some aspects, to receive the plurality of descriptors from the first set of one or more processors, the second set of one or more processors receive the plurality of descriptors from the first set of one or more processors over the electrical connection.

In some aspects, the apparatus comprises a camera, a mobile device (e.g., a mobile telephone or so-called "smart phone" or other mobile device), a wireless communication device, a wearable device, an extended reality device (e.g., a virtual reality (VR) device, an augmented reality (AR) device, or a mixed reality (MR) device), a personal computer, a laptop computer, a server computer, or other device. In some aspects, the one or more processors include an image signal processor (ISP). In some aspects, the apparatus includes a camera or multiple cameras for capturing one or more images. In some aspects, the apparatus includes an image sensor that captures the image data. In some aspects, the apparatus further includes a display for displaying the image, one or more notifications (e.g., associated with processing of the image), and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
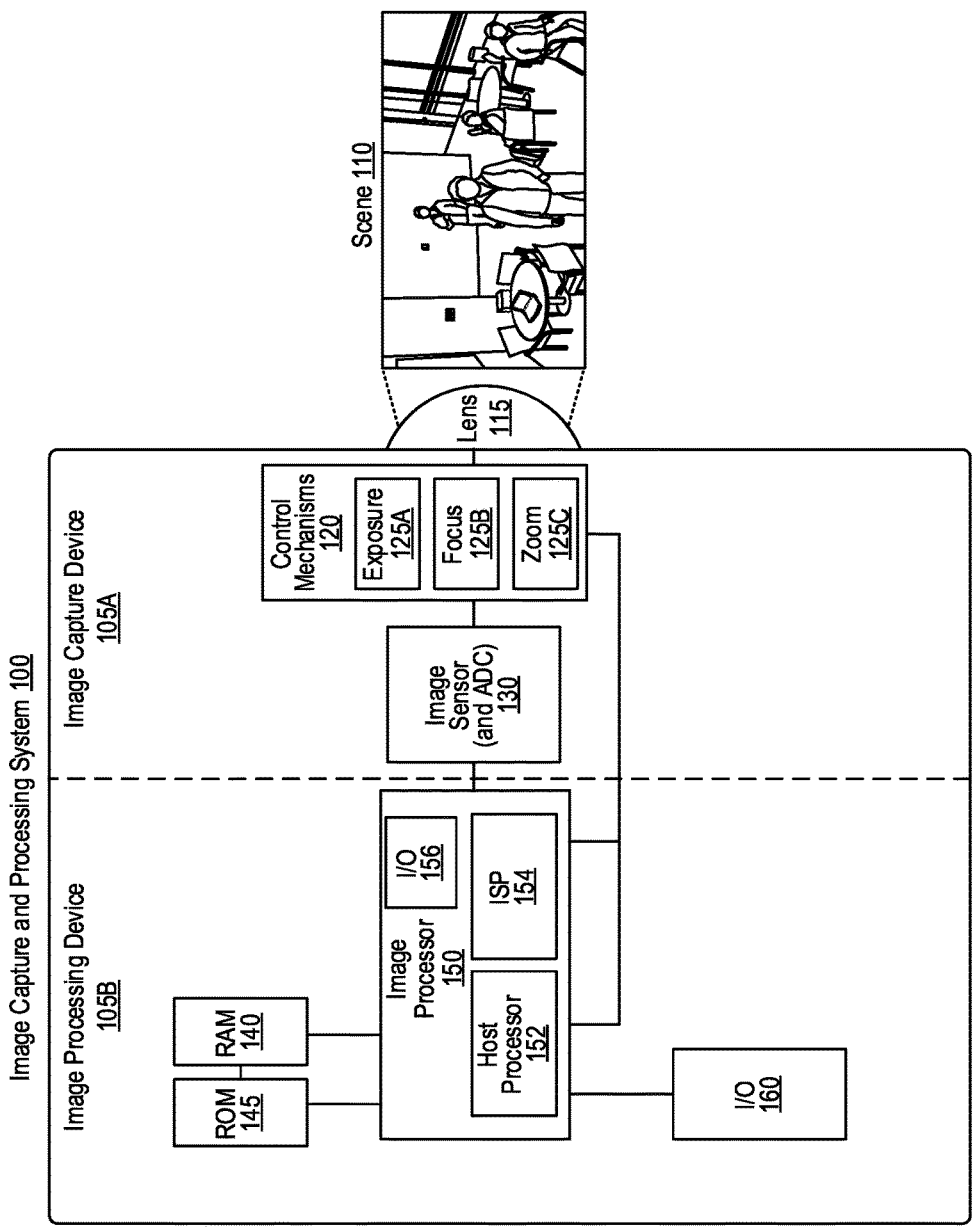
FIG. 1 is a block diagram illustrating an architecture of an image capture and processing device.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

An image capture device (e.g., a camera) is a device that receives light and captures image frames, such as still images or video frames, using an image sensor. The terms "image," "image frame," "video frame," and "frame" are used interchangeably herein. An image capture device typically includes at least one lens that receives light from a scene and bends the light toward an image sensor of the image capture device. The light received by the lens passes through an aperture controlled by one or more control mechanisms and is received by the image sensor. The one or more control mechanisms can control exposure, focus, and/or zoom based on information from the image sensor and/or based on information from an image processor (e.g., a host or application process and/or an image signal processor). In some examples, the one or more control mechanisms include a motor or other control mechanism that moves a lens of an image capture device to a target lens position.

Degrees of freedom (DoF) refer to the number of basic ways a rigid object can move through three-dimensional (3D) space. In some cases, six different DoF can be tracked. The six degrees of freedom include three translational degrees of freedom corresponding to translational movement along three perpendicular axes. The three axes can be referred to as x, y, and z axes. The six degrees of freedom include three rotational degrees of freedom corresponding to rotational movement around the three axes, which can be referred to as pitch, yaw, and roll.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. As used herein, the terms XR system and XR device are used interchangeably. Examples of XR systems or devices include head-mounted displays (HMDs), smart glasses, among others. In some cases, an XR system can track parts of the user (e.g., a hand and/or fingertips of a user) to allow the user to interact with items of virtual content.

Visual simultaneous localization and mapping (VSLAM) is a computational geometry technique used in devices with cameras, such as robots, head-mounted displays (HMDs), mobile handsets, and autonomous vehicles. In VSLAM, a device can construct and update a map of an unknown environment based on images captured by the device's camera. The device can keep track of the device's pose within the environment (e.g., location and/or orientation) as the device updates the map. For example, the device can be activated in a particular room of a building and can move throughout the interior of the building, capturing images. The device can map the environment, and keep track of its location in the environment, based on tracking where different objects in the environment appear in different images.

In the context of systems that track movement through an environment, such as XR systems and/or VSLAM systems, degrees of freedom can refer to which of the six degrees of freedom the system is capable of tracking. 3DoF systems generally track the three rotational DoF—pitch, yaw, and roll. A 3DoF headset, for instance, can track the user of the headset turning their head left or right, tilting their head up or down, and/or tilting their head to the left or right. 6DoF systems can track the three translational DoF as well as the three rotational DoF. Thus, a 6DoF headset, for instance, and can track the user moving forward, backward, laterally, and/or vertically in addition to tracking the three rotational DoF.

Systems that track movement through an environment, such as XR systems and/or VSLAM systems, generally include powerful processors. These powerful processors can be used to perform complex operations quickly enough to display an up-to-date output based on those operations to the users of these systems. Such complex operations can relate to feature tracking, 6DoF tracking, VSLAM, rendering virtual objects to overlay over the user's environment in XR, animating the virtual objects, and/or other operations discussed herein. Powerful processors typically draw power at a high rate. Sending large quantities of data to powerful processors typically draws power at a high rate, and such systems often capture large quantities of sensor data (e.g., images, location data, and/or other sensor data) per second. Headsets and other portable devices typically have small batteries so as not to be uncomfortably heavy to users. Thus, typical XR headsets either must be plugged into an external power source, are uncomfortably heavy due to inclusion of large batteries, or have very short battery lives.

As described in more detail herein, systems, apparatuses, methods (also referred to as processes, and computer-readable media (collectively referred to herein as "systems and techniques") are described herein for dividing image processing operations among multiple processors to optimize use of power, data bandwidth, and other computational resources. The image processing operations can support 3DoF tracking, 6DoF tracking, VSLAM, simultaneous localization and mapping (SLAM), AR, VR, MR, XR, or a combination thereof. For example, a tracking system can include at least one sensor and at least two processors, including a sensor processor and an analysis processor. The sensor processor can be a processor that uses very little power, and can for instance use less power per second than the analysis processor. The analysis processor can be a more powerful processor than the sensor processor, and can for instance perform more calculations per second than the sensor processor. The sensor processor can receive sensor data captured by the sensor. The sensor processor can do some initial processing on the sensor data before sending its results to the analysis processor for more complex processing operations. By having the lower-powered sensor processor perform initial processing on the sensor data, the bandwidth of data sent to the higher-powered analysis processor can be reduced. The reduction in the bandwidth of data sent to the higher-powered analysis processor can reduce the amount of power used by the tracking system as a whole. Performance of the initial processing at or by the lower-powered sensor processor, rather than at or by the higher-powered analysis processor, can also reduce the amount of power used by the tracking system as a whole. These reductions in the amount of power used by the tracking system can significantly improve battery life of the tracking system without reducing performance of the tracking system.

In some examples, the sensor includes an image sensor, and the sensor data received by the sensor processor includes image data corresponding to an image. The initial processing performed by the sensor processor can include downscaling the image. The sensor processor can detect and/or extract features in the image (or in the downscaled image), for example using a scale-space search. The sensor processor can generate descriptors for the features. The sensor processor can perform other adjustments, such as to exposure and/or gain. The sensor processor can send data, such as the descriptors for the features and/or locations of the features in the image to the analysis processor.

The analysis processor can perform more complex analyses based on the data that the analysis processor receives from the sensor processor. For example, the analysis processor can perform frame to frame matching to track features between the image and other images based on the data from the sensor processor. For instance, if the image is a video frame in a video, the other images can include video frames that appear before and/or after the video frame in the video. The analysis processor can perform stereo matching based on the data from the sensor processor. For instance, if the tracking device includes a second image sensor that captures a second image contemporaneously with the image, the analysis processor can perform stereo matching using the data from the sensor processor about the image and secondary data about a second image from a second sensor processor corresponding to the sensor image sensor. The analysis processor can perform iteratively reweighted least squares (IRLS) based on the data from the sensor processor. The analysis processor can perform various simultaneous localization and mapping (SLAM) operations, such as localization, mapping, relocalization, and/or pose estimation based on the data from the sensor processor. The analysis processor can use an extended Kalman filter (EKF) for predictions and/or corrections based on the data from the sensor processor. In some examples, the analysis processor can also send data to the sensor processor, such as a predicted location of a feature in the image based on one or more other locations of the feature in one or more other images. In some examples, the sensor processor can perform additional operations, such as descriptor matching, which the analysis processor can use for feature tracking and/or stereo matching.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors (e.g., image sensor 130) may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1110 discussed with respect to the computing system 1100. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1120, read-only memory (ROM) 145/1125, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1135, any other input devices 1145, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
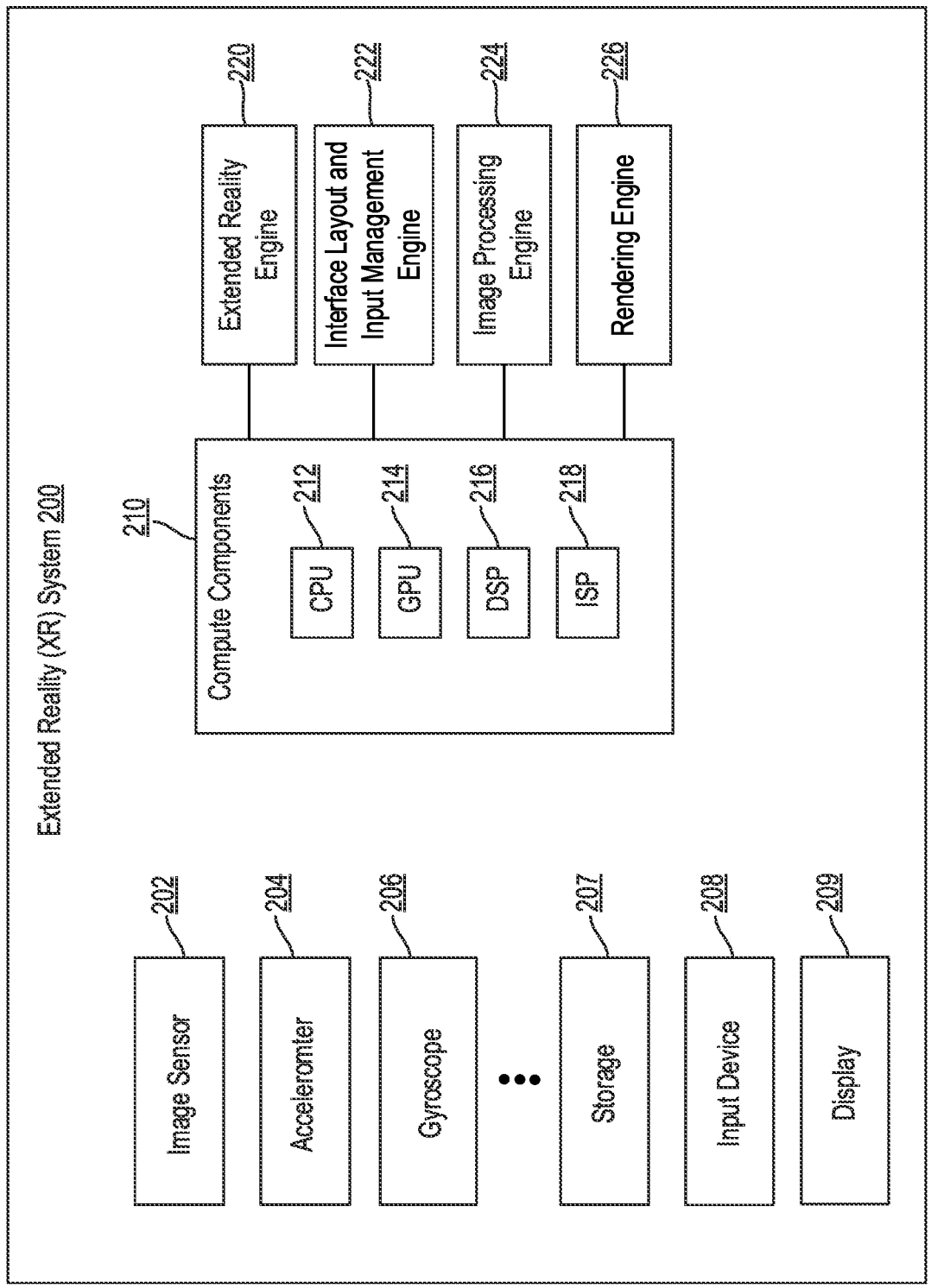
FIG. 2 is a block diagram illustrating an architecture of an example extended reality (XR) system, in accordance with some examples of the present disclosure.

In some examples, the extended reality (XR) system 200 of FIG. 2 can include the image capture and processing system 100, the image capture device 105A, the image processing device 105B, or a combination thereof. In some examples, the simultaneous localization and mapping (SLAM) system 300 of FIG. 3 can include the image capture and processing system 100, the image capture device 105A, the image processing device 105B, or a combination thereof. In some examples, the tracking system 400A of FIG. 4A can include the image capture and processing system 100, the image capture device 105A, the image processing device 105B, or a combination thereof. In some examples, the tracking system 400B of FIG. 4B can include the image capture and processing system 100, the image capture device 105A, the image processing device 105B, or a combination thereof.

FIG. 2 is a diagram illustrating an architecture of an example extended reality (XR) system 200, in accordance with some aspects of the disclosure. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an interface layout and input management engine 222, an image processing engine 224, and a rendering engine 226. It should be noted that the components 202-126 shown in FIG. 2 are non-limiting examples provided for illustrative and explanation purposes, and other examples can include more, less, or different components than those shown in FIG. 2. For example, in some cases, the XR system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors. audio sensors, etc.), one or more display devices, one more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device 1145 discussed herein, or any combination thereof. In some cases, the image sensor 202 can capture images that can be processed for interpreting gesture commands.

In some implementations, the one or more image sensors 202, the accelerometer 204, the gyroscope 206, storage 207, compute components 210, XR engine 220, interface layout and input management engine 222, image processing engine 224, and rendering engine 226 can be part of the same computing device. For example, in some cases, the one or more image sensors 202, the accelerometer 204, the gyroscope 206, storage 207, compute components 210, XR engine 220, interface layout and input management engine 222, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, interface layout and input management engine 222, image processing engine 224, and rendering engine 226 can be part of two or more separate computing devices. For example, in some cases, some of the components 202-126 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the interface layout and input management engine 222, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the interface layout and input management engine 222, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the interface layout and input management engine 222, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the interface layout and input management engine 222, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the object 202). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown), such as the SLAM system 300 of FIG. 3. SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3:
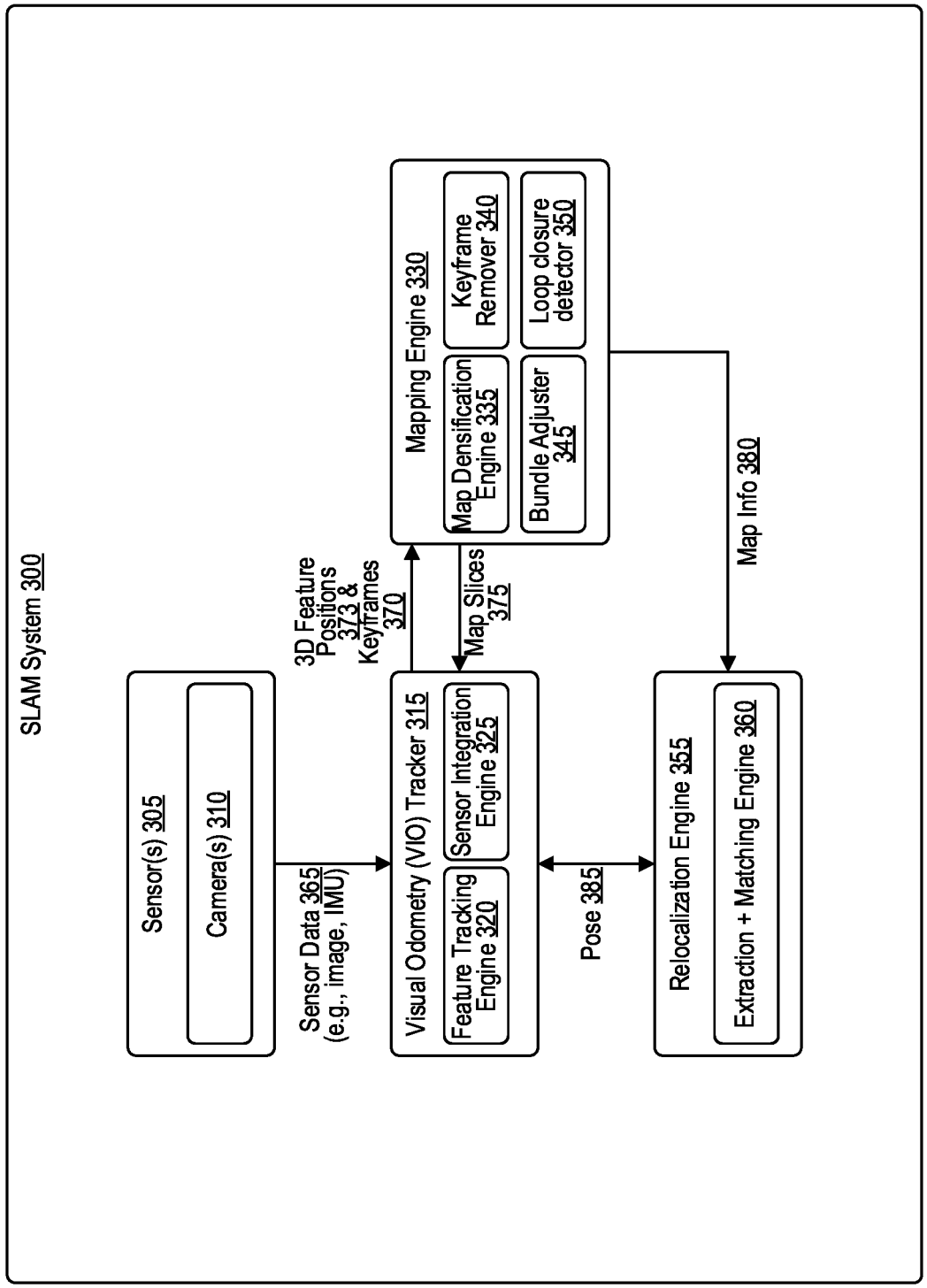
FIG. 3 is a block diagram illustrating an architecture of a simultaneous localization and mapping (SLAM) device.

FIG. 3 is a block diagram illustrating an architecture of a simultaneous localization and mapping (SLAM) system 300. In some examples, the SLAM system 300 can be, or can include, an extended reality (XR) system, such as the XR system 200 of FIG. 2. In some examples, the SLAM system 300 can be a wireless communication device, a mobile device or handset (e.g., a mobile telephone or so-called "smart phone" or other mobile device), a wearable device, a personal computer, a laptop computer, a server computer, a portable video game console, a portable media player, a camera device, a manned or unmanned ground vehicle, a manned or unmanned aerial vehicle, a manned or unmanned aquatic vehicle, a manned or unmanned underwater vehicle, a manned or unmanned vehicle, an autonomous vehicle, a vehicle, a computing system of a vehicle, a robot, another device, or any combination thereof.

The SLAM system 300 of FIG. 3 includes, or is coupled to, each of one or more sensors 305. The one or more sensors 305 can include one or more cameras 310. Each of the one or more cameras 310 may include an image capture device 105A, an image processing device 105B, an image capture and processing system 100, another type of camera, or a combination thereof. Each of the one or more cameras 310 may be responsive to light from a particular spectrum of light. The spectrum of light may be a subset of the electromagnetic (EM) spectrum. For example, each of the one or more cameras 310 may be a visible light (VL) camera responsive to a VL spectrum, an infrared (IR) camera responsive to an IR spectrum, an ultraviolet (UV) camera responsive to a UV spectrum, a camera responsive to light from another spectrum of light from another portion of the electromagnetic spectrum, or a some combination thereof.

The one or more sensors 305 can include one or more other types of sensors other than cameras 310, such as one or more of each of: accelerometers, gyroscopes, magnetometers, inertial measurement units (IMUs), altimeters, barometers, thermometers, radio detection and ranging (RADAR) sensors, light detection and ranging (LIDAR) sensors, sound navigation and ranging (SONAR) sensors, sound detection and ranging (SODAR) sensors, global navigation satellite system (GNSS) receivers, global positioning system (GPS) receivers, BeiDou navigation satellite system (BDS) receivers, Galileo receivers, Globalnaya Navigazionnaya Sputnikovaya Sistema (GLONASS) receivers, Navigation Indian Constellation (NavIC) receivers, Quasi-Zenith Satellite System (QZSS) receivers, Wi-Fi positioning system (WPS) receivers, cellular network positioning system receivers, Bluetooth® beacon positioning receivers, short-range wireless beacon positioning receivers, personal area network (PAN) positioning receivers, wide area network (WAN) positioning receivers, wireless local area network (WLAN) positioning receivers, other types of positioning receivers, other types of sensors discussed herein, or combinations thereof. In some examples, the one or more sensors 305 can include any combination of sensors of the XR system 200 of FIG. 2.

The SLAM system 300 of FIG. 3 includes a visual-inertial odometry (VIO) tracker 315. The term visual-inertial odometry may also be referred to herein as visual odometry. The VIO tracker 315 receives sensor data 365 from the one or more sensors 305. For instance, the sensor data 365 can include one or more images captured by the one or more cameras 310. The sensor data 365 can include other types of sensor data from the one or more sensors 305, such as data from any of the types of sensors 305 listed herein. For instance, the sensor data 365 can include inertial measurement unit (IMU) data from one or more IMUs of the one or more sensors 305.

Upon receipt of the sensor data 365 from the one or more sensors 305, the VIO tracker 315 performs feature detection, extraction, and/or tracking using a feature tracking engine 320 of the VIO tracker 315. For instance, where the sensor data 365 includes one or more images captured by the one or more cameras 310 of the SLAM system 300, the VIO tracker 315 can identify, detect, and/or extract features in each image. Features may include visually distinctive points in an image, such as portions of the image depicting edges and/or corners. The VIO tracker 315 can receive sensor data 365 periodically and/or continually from the one or more sensors 305, for instance by continuing to receive more images from the one or more cameras 310 as the one or more cameras 310 capture a video, where the images are video frames of the video. The VIO tracker 315 can generate descriptors for the features. Feature descriptors can be generated at least in part by generating a description of the feature as depicted in a local image patch extracted around the feature. In some examples, a feature descriptor can describe a feature as a collection of one or more feature vectors. The VIO tracker 315, in some cases with the mapping engine 330 and/or the relocalization engine 355, can associate the plurality of features with a map of the environment based on such feature descriptors. The feature tracking engine 320 of the VIO tracker 315 can perform feature tracking by recognizing features in each image that the VIO tracker 315 already previously recognized in one or more previous images, in some cases based on identifying features with matching feature descriptors in different images. The feature tracking engine 320 can track changes in one or more positions at which the feature is depicted in each of the different images. For example, the feature extraction engine can detect a particular corner of a room depicted in a left side of a first image captured by a first camera of the cameras 310. The feature extraction engine can detect the same feature (e.g., the same particular corner of the same room) depicted in a right side of a second image captured by the first camera. The feature tracking engine 320 can recognize that the features detected in the first image and the second image are two depictions of the same feature (e.g., the same particular corner of the same room), and that the feature appears in two different positions in the two images. The VIO tracker 315 can determine, based on the same feature appearing on the left side of the first image and on the right side of the second image that the first camera has moved, for example if the feature (e.g., the particular corner of the room) depicts a static portion of the environment.

The VIO tracker 315 can include a sensor integration engine 325. The sensor integration engine 325 can use sensor data from other types of sensors 305 (other than the cameras 310) to determine information that can be used by the feature tracking engine 320 when performing the feature tracking. For example, the sensor integration engine 325 can receive IMU data (e.g., which can be included as part of the sensor data 365) from an IMU of the one or more sensors 305. The sensor integration engine 325 can determine, based on the IMU data in the sensor data 365, that the SLAM system 300 has rotated 15 degrees in a clockwise direction from acquisition or capture of a first image and capture to acquisition or capture of the second image by a first camera of the cameras 310. Based on this determination, the sensor integration engine 325 can identify that a feature depicted at a first position in the first image is expected to appear at a second position in the second image, and that the second position is expected to be located to the left of the first position by a predetermined distance (e.g., a predetermined number of pixels, inches, centimeters, millimeters, or another distance metric). The feature tracking engine 320 can take this expectation into consideration in tracking features between the first image and the second image.

Based on the feature tracking by the feature tracking engine 320 and/or the sensor integration by the sensor integration engine 325, the VIO tracker 315 can determine a 3D feature positions 372 of a particular feature. The 3D feature positions 372 can include one or more 3D feature positions and can also be referred to as 3D feature points. The 3D feature positions 372 can be a set of coordinates along three different axes that are perpendicular to one another, such as an X coordinate along an X axis (e.g., in a horizontal direction), a Y coordinate along a Y axis (e.g., in a vertical direction) that is perpendicular to the X axis, and a Z coordinate along a Z axis (e.g., in a depth direction) that is perpendicular to both the X axis and the Y axis. The VIO tracker 315 can also determine one or more keyframes 370 (referred to hereinafter as keyframes 370) corresponding to the particular feature. A keyframe (from one or more keyframes 370) corresponding to a particular feature may be an image in which the particular feature is clearly depicted. In some examples, a keyframe (from the one or more keyframes 370) corresponding to a particular feature may be an image in which the particular feature is clearly depicted. In some examples, a keyframe corresponding to a particular feature may be an image that reduces uncertainty in the 3D feature positions 372 of the particular feature when considered by the feature tracking engine 320 and/or the sensor integration engine 325 for determination of the 3D feature positions 372. In some examples, a keyframe corresponding to a particular feature also includes data about the pose 385 of the SLAM system 300 and/or the camera(s) 310 during capture of the keyframe. In some examples, the VIO tracker 315 can send 3D feature positions 372 and/or keyframes 370 corresponding to one or more features to the mapping engine 330. In some examples, the VIO tracker 315 can receive map slices 375 from the mapping engine 330. The VIO tracker 315 can feature information within the map slices 375 for feature tracking using the feature tracking engine 320.

Based on the feature tracking by the feature tracking engine 320 and/or the sensor integration by the sensor integration engine 325, the VIO tracker 315 can determine a pose 385 of the SLAM system 300 and/or of the cameras 310 during capture of each of the images in the sensor data 365. The pose 385 can include a location of the SLAM system 300 and/or of the cameras 310 in 3D space, such as a set of coordinates along three different axes that are perpendicular to one another (e.g., an X coordinate, a Y coordinate, and a Z coordinate). The pose 385 can include an orientation of the SLAM system 300 and/or of the cameras 310 in 3D space, such as pitch, roll, yaw, or some combination thereof. In some examples, the VIO tracker 315 can send the pose 385 to the relocalization engine 355. In some examples, the VIO tracker 315 can receive the pose 385 from the relocalization engine 355.

The SLAM system 300 also includes a mapping engine 330. The mapping engine 330 generates a 3D map of the environment based on the 3D feature positions 372 and/or the keyframes 370 received from the VIO tracker 315. The mapping engine 330 can include a map densification engine 335, a keyframe remover 340, a bundle adjuster 345, and/or a loop closure detector 350. The map densification engine 335 can perform map densification, in some examples, increase the quantity and/or density of 3D coordinates describing the map geometry. The keyframe remover 340 can remove keyframes, and/or in some cases add keyframes. In some examples, the keyframe remover 340 can remove keyframes 370 corresponding to a region of the map that is to be updated and/or whose corresponding confidence values are low. The bundle adjuster 345 can, in some examples, refine the 3D coordinates describing the scene geometry, parameters of relative motion, and/or optical characteristics of the image sensor used to generate the frames, according to an optimality criterion involving the corresponding image projections of all points. The loop closure detector 350 can recognize when the SLAM system 300 has returned to a previously mapped region, and can use such information to update a map slice and/or reduce the uncertainty in certain 3D feature points or other points in the map geometry. The mapping engine 330 can output map slices 375 to the VIO tracker 315. The map slices 375 can represent 3D portions or subsets of the map. The map slices 375 can include map slices 375 that represent new, previously-unmapped areas of the map. The map slices 375 can include map slices 375 that represent updates (or modifications or revisions) to previously-mapped areas of the map. The mapping engine 330 can output map information 380 to the relocalization engine 355. The map information 380 can include at least a portion of the map generated by the mapping engine 330. The map information 380 can include one or more 3D points making up the geometry of the map, such as one or more 3D feature positions 372. The map information 380 can include one or more keyframes 370 corresponding to certain features and certain 3D feature positions 372.

The SLAM system 300 also includes a relocalization engine 355. The relocalization engine 355 can perform relocalization, for instance when the VIO tracker 315 fail to recognize more than a threshold number of features in an image, and/or the VIO tracker 315 loses track of the pose 385 of the SLAM system 300 within the map generated by the mapping engine 330. The relocalization engine 355 can perform relocalization by performing extraction and matching using an extraction and matching engine 360. For instance, the extraction and matching engine 360 can by extract features from an image captured by the cameras 310 of the SLAM system 300 while the SLAM system 300 is at a current pose 385, and can match the extracted features to features depicted in different keyframes 370, identified by 3D feature positions 372, and/or identified in the map information 380. By matching these extracted features to the previously-identified features, the relocalization engine 355 can identify that the pose 385 of the SLAM system 300 is a pose 385 at which the previously-identified features are visible to the cameras 310 of the SLAM system 300, and is therefore similar to one or more previous poses 385 at which the previously-identified features were visible to the cameras 310. In some cases, the relocalization engine 355 can perform relocalization based on wide baseline mapping, or a distance between a current camera position and camera position at which feature was originally captured. The relocalization engine 355 can receive information for the pose 385 from the VIO tracker 315, for instance regarding one or more recent poses of the SLAM system 300 and/or cameras 310, which the relocalization engine 355 can base its relocalization determination on. Once the relocalization engine 355 relocates the SLAM system 300 and/or cameras 310 and thus determines the pose 385, the relocalization engine 355 can output the pose 385 to the VIO tracker 315.

In some examples, the VIO tracker 315 can modify the image in the sensor data 365 before performing feature detection, extraction, and/or tracking on the modified image. For example, the VIO tracker 315 can rescale and/or resample the image. In some examples, rescaling and/or resampling the image can include downscaling, downsampling, subscaling, and/or subsampling the image one or more times. In some examples, the VIO tracker 315 modifying the image can include converting the image from color to greyscale, or from color to black and white, for instance by desaturating color in the image, stripping out certain color channel(s), decreasing color depth in the image, replacing colors in the image, or a combination thereof. In some examples, the VIO tracker 315 modifying the image can include the VIO tracker 315 masking certain regions of the image. Dynamic objects can include objects that can have a changed appearance between one image and another. For example, dynamic objects can be objects that move within the environment, such as people, vehicles, or animals. A dynamic objects can be an object that have a changing appearance at different times, such as a display screen that may display different things at different times. A dynamic object can be an object that has a changing appearance based on the pose of the camera(s) 310, such as a reflective surface, a prism, or a specular surface that reflects, refracts, and/or scatters light in different ways depending on the position of the camera(s) 310 relative to the dynamic object. The VIO tracker 315 can detect the dynamic objects using facial detection, facial recognition, facial tracking, object detection, object recognition, object tracking, or a combination thereof. The VIO tracker 315 can detect the dynamic objects using one or more artificial intelligence algorithms, one or more trailed mechine learning models, one or more trained neural networks, or a combination thereof. The VIO tracker 315 can mask one or more dynamic objects in the image by overlaying a mask over an area of the image that includes depiction(s) of the one or more dynamic objects. The mask can be an opaque color, such as black. The area can be a bounding box having a rectangular or other polygonal shape. The area can be determined on a pixel-by-pixel basis.

Figure 4A:
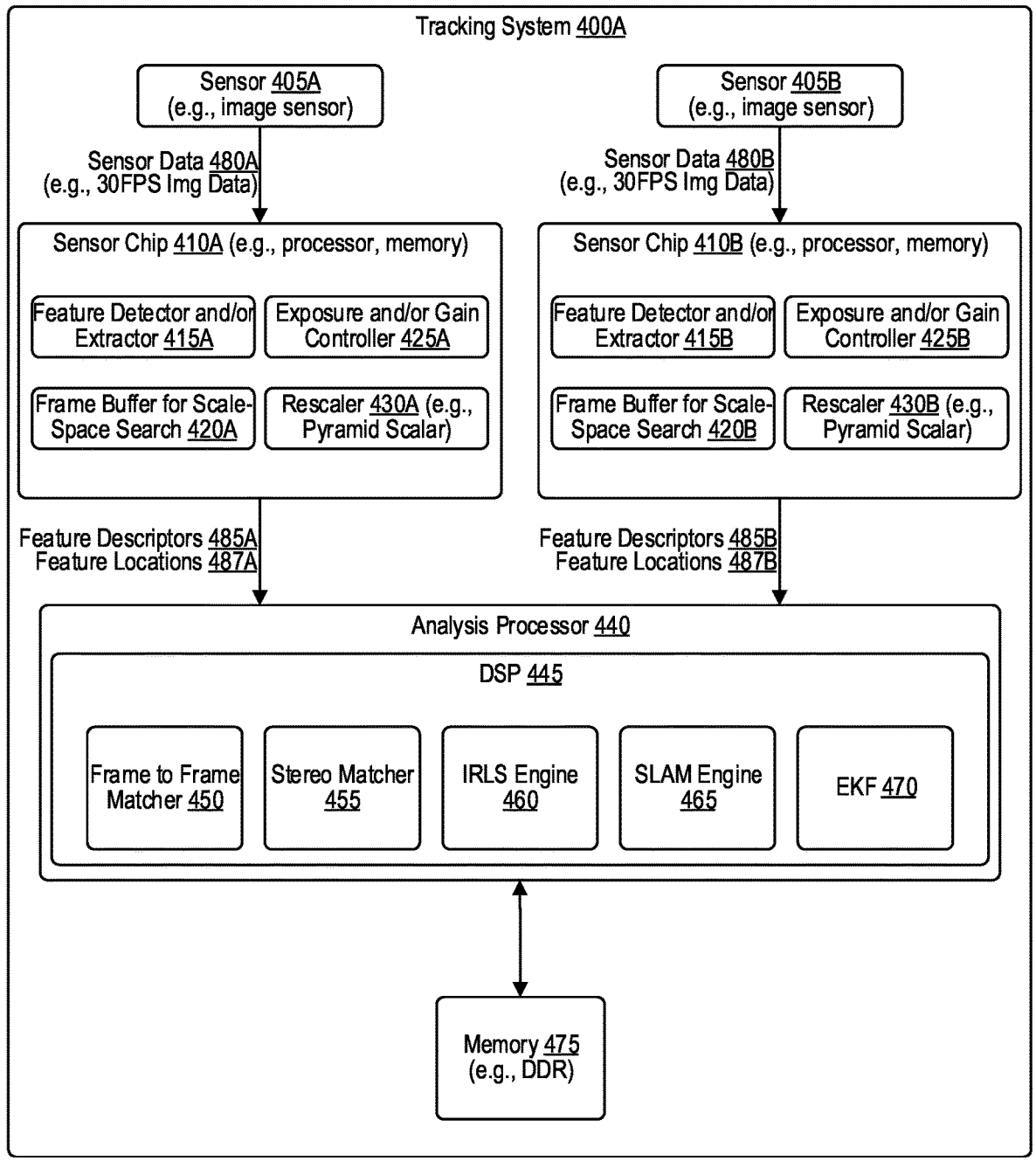
FIG. 4A is a block diagram illustrating an architecture of a tracking system that includes sensor chips that send data to an application processor.

FIG. 4A is a block diagram illustrating an architecture of a tracking system 400A that includes sensor chips 410A and 410B that send data to an analysis processor 440. In some examples, the tracking system 400A may be a part of, or may include, an XR system 200. In some examples, the tracking system 400A may be a part of, or may include, a SLAM system 300. The tracking system 400A includes a first sensor 405A and a second sensor 405B. In some example, either or both of the first sensor 405A and the second sensor 405B can be image sensors. In some examples, each of the sensors 405A-405B can include an image capture device 105A, an image processing device 105B, an image capture and processing system 100, another type of camera, or a combination thereof.

The sensor 405A captures sensor data 480A and sends the sensor data 480A to a sensor chip 410A. The sensor 405B captures sensor data 480B and sends the sensor data 480B to a sensor chip 410B. In some examples, the sensor data 480A, the sensor data 480B, or both may be image data corresponding to one or more images. The image data in the sensor data 480A-480B (and/or any data from any other types of sensors) may be captured at and/or sent to the sensor chips 410A-410B a particular rate. The rate of capture and/or of transmission may be 15 frames per second (FPS), 20 FPS, 25 FPS, 30 FPS, 35 FPS, 40 FPS, 45 FPS, 50 FPS, 55 FPS, 60 FPS, 65 FPS, 70 FPS, 75 FPS, 80 FPS, 85 FPS, 90 FPS, 95 FPS, 100 FPS, 105 FPS, 110 FPS, 115 FPS, 120 FPS, a rate lower than 15 FPS, a rate greater than 120 FPS, ora rate in between any two previously-listed rates. With respect to images in the sensor data 480A-480B, the frame-per-second capture and/or transfer rate can refer to how many image frames (images) are captured by the sensors 405A-405B and/or transferred from the sensors 405A-405B to the sensor chips 410A-410B in a given second. With respect to other types of data from other types of sensors 405A-405B (other than image sensors), the frame-per-second capture and/or transfer rate can refer to how many sensor measurements are captured by the sensors 405A-405B and/or transferred from the sensors 405A-405B to the sensor chips 410A-410B in a given second.

The sensor chips 410A-410B can each include one or more processors, which may be referred to as sensor processors. In some examples, the sensor chips 410A-410B can share a single processor, which may be referred to as a sensor processor. The one or more sensor processors of the tracking system 400A can be referred to as a first set of one or more processors of the tracking system 400A. The sensor chips 410A-410B can each include one or more memory and/or data storage units, which may be referred to as sensor memory units. In some examples, the sensor chips 410A-410B can share a single memory and/or data storage units, which may be referred to as a sensor memory unit. The one or more sensor memory units of the tracking system 400A can be referred to as a first set of one or more memory units of the tracking system 400A.

The tracking system 400A can include an analysis processor 440. In some examples, the analysis processor 440 is more powerful (e.g., performs more calculations per second) than each of the one or more sensor processors of the sensors chips 410A-410B. In some examples, each of the one or more sensor processors of the sensors chips 410A-410B can have a lower power usage rate (e.g., power draw from a battery or other power source) than the analysis processor 440. The analysis processor 440 can include at least one digital signal processor (DSP) 445. While the analysis processor 440 is referred to in the singular form, it should be understood that the tracking system 400A may include multiple processors as part of the analysis processor 440. The one or more analysis processors 440 can be referred to as a second set of one or more processors of the tracking system 400A.

The sensor chips 410A-410B can use the one or more sensor processors and one or more sensor memory units as part of various modules of the sensor chips 410A-410B for performing various operations. The sensor chips 410A-410B can each include a feature detector and/or extractor 415A-415B. The sensor chips 410A-410B can each include a frame buffer for a scale-space search 420A-420B. Using the feature detector and/or extractor 415A, the sensor chip 410A can detect and/or extract features from an image that the sensor chip 410A receives as part of the sensor data 480A from the sensor 405A. In the image, a feature is a distinctive, unique, and/or identifiable part of an image, such as a part of an image depicting a corner, an edge, and/or a blob. A blob may be defined as area in which a particular property (e.g., brightness, color, etc.) is constant or approximately constant. To detect features and/or extract features in the image, the feature detector and/or extractor 415A can perform a scale-space search, for which the feature detector and/or extractor 415A can use the frame buffer for scale-space search 420A. To detect features in the image, the feature detector and/or extractor 415A can use edge detection, corner detection, blob detection, ridge detection, affine invariant feature detection, or a combination thereof. Edge detection can include, for example, Canny, Deriche, Differential, Sobel, Prewitt, and/or Roberts cross edge detection. Corner Detection can include, for example, Harris operator, Shi and Tomasi, level curve curvature, Hessian feature strength measures, smallest univalue segment assimilating nucleus (SUSAN), and/or features from accelerated segment test (FAST) corner detection. Blob detection can include, for example, Laplacian of Gaussian (LoG), Difference of Gaussians (DoG), Determinant of Hessian (DoH), Maximally stable extremal regions, and/or Principal curvature-based region detector (PCBR) blob detection. Affine invariant feature detection can include Affine shape adaptation, Harris affine, and/or Hessian affine feature detection.

To extract features, the feature detector and/or extractor 415A can generate descriptors for the features. A descriptor for a feature may be generated based on extraction of a local image patch around the feature, and description of the feature as depicted in the local image patch. The feature descriptor may, for example, describe the feature as a collection of one or more feature vectors. Features may be extracted using any suitable technique, such as Scale Invariant Feature Transform (SIFT), Learned Invariant Feature Transform (LIFT), Speed Up Robust Features (SURF), Gradient Location-Orientation histogram (GLOH), Histogram of Oriented Gradients (HOG), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof. In some examples, feature detection and/or feature extraction using the feature detector and/or extractor 415A can include identifying a location of the feature within the image, identifying a location of the feature within a 3D environment, or both.

In some examples, the feature detector and/or extractor 415A can generate descriptors of varying complexities and/or descriptor types based on whether an image is a keyframe or not. For instance, the descriptor types can include a first descriptor type and a second descriptor type. The first descriptor type and a second descriptor type can have different levels of complexity. For instance, the first descriptor type can be more complex than the second descriptor type. In an illustrative example, the feature detector and/or extractor 415A can generate descriptors having a low complexity for features in images that are not keyframes. These low-complexity descriptors can be referred to as C1 descriptors, or as descriptors of the second descriptor type. On the other hand, the feature detector and/or extractor 415A can generate descriptors having a high complexity for features in images that are keyframes. These high-complexity descriptors can be referred to as C2 descriptors, or as descriptors of the first descriptor type. In some examples, the feature detector and/or extractor 415A can generate both C1 descriptors and C2 descriptors for features detected in keyframes. C1 descriptors can include enough information for feature tracking via the frame-to-frame matcher 450 and/or for feature localization using the stereo matcher 455, for example. C2 descriptors can include enough information for relocalization (in the SLAM engine 465) in addition to feature tracking via frame-to-frame matching (by the frame to frame matcher 450) and/or for stereo matching (by the stereo matcher 455). In some examples, C2 descriptors have a higher resolution than C2 descriptors. In some examples, C2 descriptors occupy more storage space than C1 descriptors. In an illustrative example, each C1 descriptor may occupy 32 bytes, while each C2 descriptor occupies 128 bytes. Examples of generation of C1 descriptors and C2 descriptors for keyframe images and non-keyframe images is illustrated in, and discussed further with respect to, FIG. 5.

A keyframe for a particular feature can refer to in image in which that particular feature is more clearly depicted than in other images. In some examples, a keyframe for a particular feature refers to in image in which that particular feature is clearly depicted from a particular angle or viewpoint that is different from other angles or viewpoints that other images depict the feature from. In some examples, a keyframe corresponding to a particular feature may be an image that reduces uncertainty in the 3D feature position of the particular feature, with respect to the SLAM engine 465.

The sensor chips 410A-410B can each include a rescaler 430A-430B that can rescale an image received from the sensors 405A-405B. To rescale the image, the rescaler 430A-430B can downscale, downsample, subsample, upscale, and/or upsample the image. In some examples, the image can be downscaled, downsampled, and/or subsampled multiple times using a pyramid scalar. In some examples, the sensor chip 410A can generate a rescaled image (e.g., a downscaled image) by rescaling the image received from the sensor 405A using the rescaler 430A. In some examples, the sensor chips 410A detects features in, and/or extracts features from, the resampled image (instead of or in addition to the image) using the feature detector and/or extractor 415A. In some examples, the sensor chip 410A can generate a modified image by processing the image received from the sensor 405A. In some examples, the sensor chips 410A detects features in, and/or extracts features from, the modified image (instead of or in addition to the image) using the feature detector and/or extractor 415A. The modified image can be a rescaled image rescaled by the rescaler. The modified image be a variant of the image that has been converted to a different color space, a more limited color palate, greyscale, or black and white. The modified image be a variant of the image that has undergone perspective distortion correction, for example to remove radial distortion (e.g., barrel distortion, pincushion distortion) or to make the image from the sensor 405A co-planar with an image from the sensor 405B.

The sensor chips 410A-410B can each include an exposure and/or gain controller 425A-425B. The adjustment of exposure and/or gain of a sensor 405A by the exposure and/or gain controller 425A of the sensor chip 410A may be a separate from the feature detection and/or extraction operations. In some illustrative examples, the sensor chip 410A is the only hardware that actually has access to the entire image(s) captured by the sensor 405, since the analysis processor 440 receives data that has already been processed by the sensor chip 410A (e.g., the feature descriptors 485A and/or the feature locations 487A). In some examples, the analysis processor 440 can receive certain images as captured by the sensors 405A-405B. However, because the sensor chips 410A-410B are closer to the sensors 405A-405B, and at least in some cases receive more of the originally captured sensor data The sensor chips 410A-410B can send feature descriptors 485A-485B to the analysis processor 440. The feature descriptors 485A-485B may be any type of feature descriptors discussed above as being generated by the feature detector and/or extractors 415A-415B. In some examples, the sensor chips 410A-410B can send feature locations 487A-487B to the analysis processor. In some examples the feature locations 487A are part of the feature descriptors 485A, and/or the feature locations 487B are part of the feature descriptors 485B. In some examples, the feature locations 487A-487B refer to the locations of the detected and extracted features within the image captured by the sensors 405A-405B (e.g., pixel coordinates of the features). In some examples, the feature locations 487A-487B refer to the locations of the detected and extracted features within the 3D environment that is photographed in the image captured by the sensors 405A-405B.d The analysis processor 440 can include the DSP 445. The analysis processor 440 can receive the feature descriptors 485A-485B and/or the feature locations 487A-487B from the sensor chips 410A-410B. The analysis processor 440 can be coupled to a memory 475, which may in some cases be Double Data Rate (DDR) memory, a random access memory, another high data rate memory, another type of memory discussed herein, or a combination thereof. The analysis processor 440 and/or the DSP 445 can include various modules for performing various operations based on the feature descriptors 485A-485B and/or the feature locations 487A-487B. The analysis processor 440 and/or the DSP 445 can associate the plurality of features with a map of the environment based on at least a subset of the feature descriptors 485A-485B and/or the feature locations 487A-487B. For example, the analysis processor 440 and/or the DSP 445 can include a frame-to-frame matcher 450 that performs feature tracking of certain features from one frame to the next, and so forth. The term "frame" can refer to an image frame or video frame, for instance if the sensors 405A-405B capture video frames of a video. In some examples, the frame-to-frame matcher 450 tracks a subset of the features for which the analysis processor 440 receives feature descriptors 485A-485B and/or feature locations 487A-487B. For example, the sensor chips 410A-410B can extract a large number (e.g., 1000) feature descriptors per frame, while the frame-to-frame matcher 450 finds matches in other images for, and therefore tracks, a smaller number of features (e.g., 250). In some examples, the frame-to-frame matcher 450 finds matches in other images for a particular feature using descriptor matching. Descriptor matching may include comparing a first set of feature descriptors that the analysis processor 440 receives from the sensor chips 410A-410B for a first image to a second set of feature descriptors that the analysis processor 440 receives from the sensor chips 410A-410B for a second image. Descriptor matching may also include comparing a first set of descriptors of the map features that analysis processor 440 receives from its own SLAM engine 465 to a second set of feature descriptors that the analysis processor 440 receives from the sensor chips 410A-410B. A feature descriptor in the first set of feature descriptors that matches, or that shares at least a threshold degree of similarity with, a feature descriptor in the second set of feature descriptors, can be considered to be describing the same feature by the frame-to-frame matcher 450, and can be tracked by the frame-to-frame matcher 450.

The analysis processor 440 and/or the DSP 445 can include a stereo matcher 455 that performs stereo matching based on the feature descriptors 485A-485B and/or feature locations 487A-487B generated by the sensor chips 410A-410B from images captured contemporaneously using the different sensors 405A-405B. For example, the sensor 405A may be a camera on a left side of a housing of the tracking system 400A, while the sensor 405B may be a camera on a right side of a housing of the tracking system 400A. The sensor 405A can capture a first image and the sensor 405B can capture a second image contemporaneously. The stereo matcher 455 can compare the feature descriptors 485A and/or feature locations 487A of the features that the sensor chip 410A detected in the first image to the feature descriptors 485B and/or feature locations 487B of the features that the sensor chip 410B detected in the second image. The stereo matcher 455 can identify features in the first image that match, or that share at least a threshold degree of similarity (e.g., with respect to feature descriptors and/or feature locations) with, features in the second image. The stereo matcher 455 can thus identify a feature that appears in both the first image and the second image, and that corresponds to a specific point in the 3D environment that is photographed in both the first image and the second image. Because the sensor 405A and the sensor 405B are in slightly different positions, the stereo matcher 455 can determine the 3D coordinates of the point in the 3D environment that the feature depicts. In some examples, to perform stereo matching, the stereo matcher 455 matches feature descriptors along an epipolar line. In some examples, to perform stereo matching, the stereo matcher 455 matches feature descriptors along an epipolar line against corners detected along an epipolar line. Stereo matching may be referred to binocular matching, stereo triangulation, binocular triangulation, or a combination thereof.

The analysis processor 440 and/or the DSP 445 can include a Iteratively Reweighted Least Squares (IRLS) engine 460 that can perform an IRLS operation based on the feature descriptors 485A-485B and/or feature locations 487A-487B. The IRLS engine 460 can process information gained from tracked features to estimate an accurate pose and/or trajectory of the tracking system 400A. In some examples, the IRLS engine 460 may be replaced by an alternate element that process information gained from tracked features to estimate an accurate pose and/or trajectory of the tracking system 400A using another technique. In some examples, the IRLS engine 460 may be removed or skipped.

The analysis processor 440 and/or the DSP 445 can include a simultaneous localization and mapping (SLAM) engine 465 that can perform various SLAM operations, such as localization, mapping, relocalization, and/or pose estimation based on the feature descriptors 485A-485B and/or feature locations 487A-487B. The SLAM engine 465 can perform any operation discussed with respect to at least the VIO tracker 315, mapping engine 330 and/or the relocalization engine 355 of the SLAM system 300. In some examples, feature descriptors 485A-485B and/or feature locations 487A-487B extracted from keyframes by the sensor chips 410A-410B are used in place of the keyframes 370 in FIG. 3. For instance, the SLAM engine 465 can generate a map of the environment that does not store keyframe images, but instead stores C1 descriptors and/or C2 descriptors for keyframes, 3D locations (e.g., sets of 3D coordinates) for each feature, keyframe poses (e.g., a pose of the tracking system 400 at which a keyframe was captured), feature locations 487A-487B, or combinations thereof. The SLAM engine 465 can generate a pose of the tracking system 400, of the sensor 405A, and/or of the sensor 405B. The SLAM engine 465 can use C1 descriptors and/or C2 descriptors for keyframes, 3D locations for each feature, keyframe poses, and/or feature locations 487A-487B for relocalization.

In some cases, the SLAM engine 465 may generate the map, and may store descriptors associated with the map. The SLAM engine 465 may retain certain descriptors while deleting or removing others. For example, the may keep descriptors that represent a different observation viewpoint of a particular feature than is already stored (e.g., different view angle by at least a predetermined angle threshold). In some examples, the SLAM engine 465 can generate a mean descriptor for a particular feature based on the mean of multiple feature descriptors for the particular feature. The SLAM engine 465 can keep the mean descriptor for the feature, and can delete the multiple feature descriptors for the feature that were used to generate the mean feature.

The analysis processor 440 and/or the DSP 445 can include an Extended Kalman Filter (EKF) 470 that can perform predictions, corrections, and/or updates based on the feature descriptors 485A-485B and/or feature locations 487A-487B. The EKF 470 combines information obtained from multiple sensors to obtain an optimal estimate of the pose and/or trajectory of the tracking system 400A. In some examples, the EKF 470 can use the inertial measurement unit (IMU) sensor to predict approximate pose of the tracking system 400A at a time increment relative to current time instance. This predicted pose of the tracking system 400A is used to calculate predicted 2D locations in the current frame, of the 3D map point features from SLAM engine 465. The descriptor matching step (e.g., as discussed above with respect to the frame-to-frame matcher 450) then provides the actual 2D locations of 3D map point features, which may be referred to as 'measurements' with respect to the EKF 470. The EKF 470 uses these measured 2D locations of map points to update its initial estimate (e.g., the predicted position/pose of the tracking system 400A) to obtain the optimal estimate of the location/pose of the tracking system 400A.

By having the lower-powered sensor processor perform rescaling and/or feature detection/extraction on the sensor data 480A-480B, the bandwidth of data that is ultimately sent to the higher-powered analysis processor 440 can be reduced. In some examples, use of a tracking system 400A with rescaling and/or feature detection/extraction handed by the sensor chips 410A-410B while the analysis processor 440 handles feature tracking, stereo matching, IRLS, SLAM, and/or EFK achieves an 81% reduction in data bandwidth going to the analysis processor 440 over a system in which all of these functions are performed by the analysis processor 440. The reduction in the bandwidth of data sent to the higher-powered analysis processor can reduce the amount of power used by the tracking system 400A compared to systems without sensor chips 410A-410B. Performance of rescaling and/or feature detection/extraction at or by the lower-powered sensor chips 410A-410B, rather than performing the same operations at or by the higher-powered analysis processor 440, also reduces the amount of power used by the tracking system 400A. These reductions in the amount of power used by the tracking system can significantly improve battery life of the tracking system 400A without reducing performance of the tracking system.

In some cases, further optimizations may be used. For example, the analysis processor 440 may cache C1 and/or C2 feature descriptors 485A-485B in the memory 475 for features that are being actively tracked using the frame-to-frame matcher 450, stereo matcher 455, and/or SLAM engine 465. In some examples, the sensor chips 410A-410B can send feature descriptors 485A-485B to the analysis processor 440 only for features that are located in the outer 50% of an image, for instance because the features that are located in the inner 50% of the image are likely to already have feature descriptors cached in the memory 475 by the analysis processor 440. In some examples, the sensor chips 410A-410B can compress the feature descriptors 485A-485B and/or the feature locations 487A-487B before sending the feature descriptors 485A-485B and/or the feature locations 487A-487B to the analysis processor 440. The analysis processor 440 can decompress the compressed feature descriptors 485A-485B and/or the feature locations 487A-487B upon receipt. In some examples, the SLAM engine 465 only stores feature descriptors of map points for only some of the keyframes, such as keyframes with the most unique perspectives and/or viewpoints on as many features as possible.

In some examples, hierarchical descriptors may be used. For instance, the more complex C2 descriptor may include the less complex C1 descriptor, with a delta added or appended on, inside, and/or around the C1 descriptor. For instance, for FREAK descriptors or other binary descriptors, the C1 descriptor can sample only a fraction of pixel pairs to compute the binary pattern, while the corresponding C2 descriptor samples more pixel pairs to compute the binary pattern. The pattern in the C1 descriptor can be chosen carefully by the sensor chips 410A-410B to still produce a faithful representation of the feature and/or the image patch. For SIFT descriptors or similar descriptors, the sensor chips 410A-410B can, in some examples, generate the C1 descriptor by quantizing a gradient histogram to a low number of bits, such as 4 bits, 2 bits, or even 1 bit. The sensor chips 410A-410B can, in some examples, generate the C2 descriptor by quantizing a gradient histogram to a higher number of bits, such as 8 bits. The sensor chips 410A-410B can, in some examples, generate the C1 descriptor to contain a histogram of lower resolution bins, while the delta can include fewer bins at a higher resolution, so that the C2 descriptor includes both.

Figure 4B:
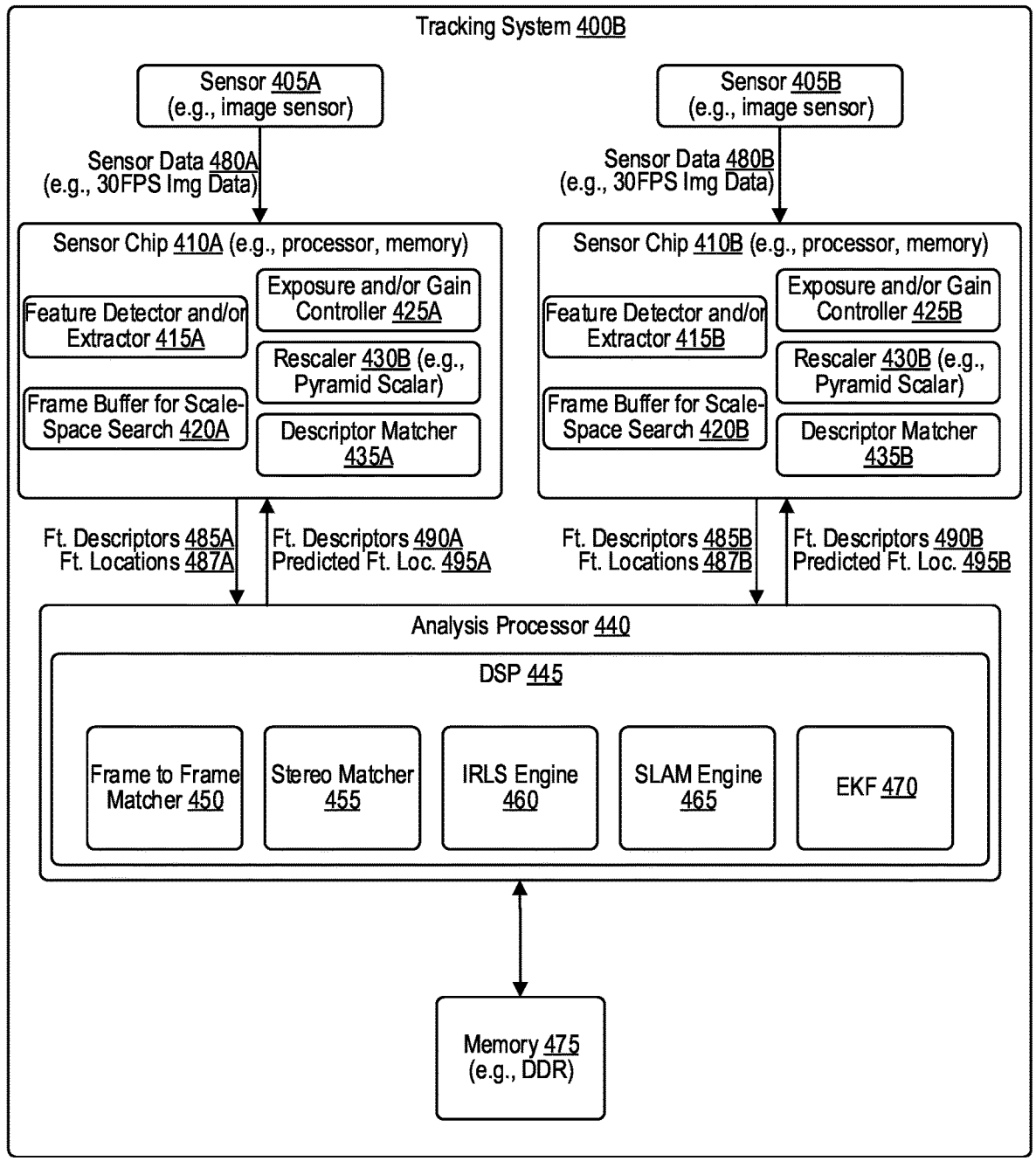
FIG. 4B is a block diagram illustrating an architecture of a tracking system that includes sensor chips that send data to an application processor and/or receive data from the application processor.

FIG. 4B is a block diagram illustrating an architecture of a tracking system 400B that includes sensor chips 410A and 410B that send data to an analysis processor 440 and/or receive data from the analysis processor 440. The tracking system 400B is the tracking system 400A with a few adjustments and/or additions.

For instance, in the tracking system 400B, the analysis processor 440 sends some data to the sensor chips 410A-410B. In particular, the analysis processor 440 can send certain feature descriptors 490A-490B to the sensor chips 410A-410B, in some cases along with predicted feature locations 495A-495B for the feature descriptors 490A-490B. The feature descriptors 490A-490B can include feature descriptors for features that the frame-to-frame matcher 450 have tracked for one or more frames prior to the upcoming frame to be received by the sensor chips 410A-410B, for example. The feature descriptors 490A-490B can include feature descriptors for features that the SLAM engine 465 has previously encountered when the tracking system 400B was in a similar pose (e.g., as in loop closure). The predicted feature locations 495A-495B can be determined based on feature tracking (e.g., frame-to-frame matching) by the frame-to-frame matcher 450. For instance, if the frame-to-frame matcher 450 identifies that a particular feature is moving, on average, up by 4 pixels and to the left by 2 pixels in every consecutive frame (e.g., based on the feature locations 487A-487B), then the predicted feature location of that feature for the next frame can be up by 4 pixels and to the left by 2 pixels from the most recent frame.

Figure 6:
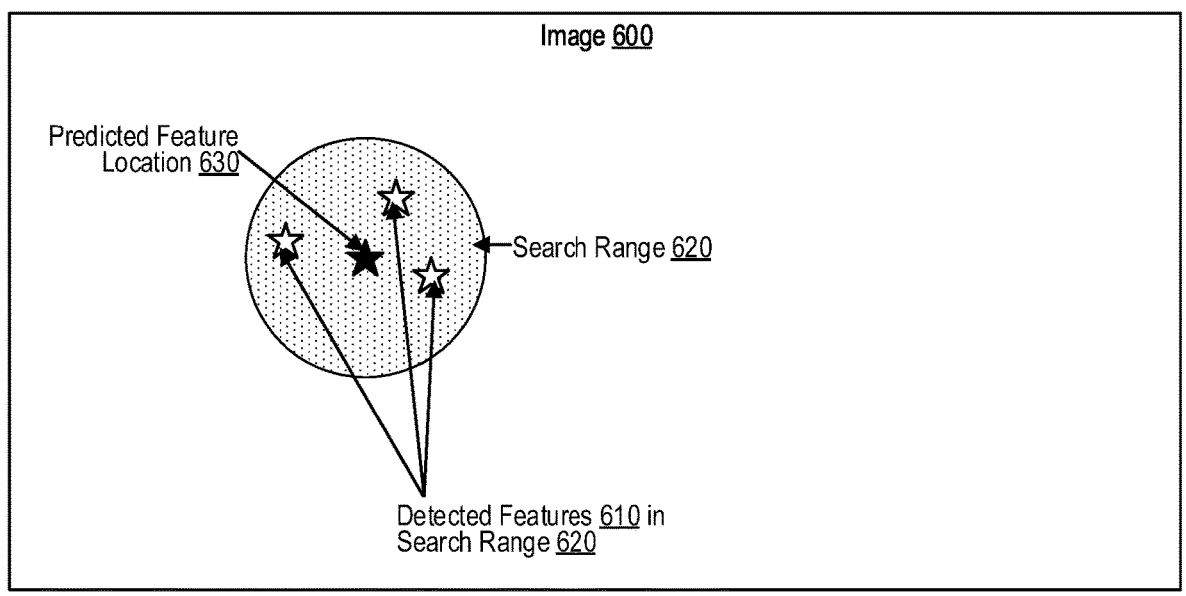
FIG. 6 is a conceptual diagram illustrating search for a feature in an image based on a predicted feature location for the feature.

The one or more sensor processors and one or more sensor memory units of the sensor chips 410A-410B of the tracking system 400B can run another module to perform an additional operation compared to the sensor chips 410A-410B of the tracking system 400A. In particular, the sensor chips 410A-410B of the tracking system 400B include a descriptor matcher 435A-435 that performs a descriptor matching operation based on the feature descriptors 490A-490B and/or the predicted feature locations 495A-495B. For instance, a sensor chip 410A can receive an image frame from the sensor 405A as sensor data 480A, and can search for a particular feature described using one of the feature descriptors 490A in one of the predicted feature locations 495A. For example, the descriptor matcher 435A of the sensor chip 410A can search for a particular feature within an area around the predicted feature location for the feature, such as a radius (having a predetermined length) around the predicted feature location for the feature. An example a search for a feature by a descriptor matcher 435A-435B is illustrated in FIG. 6.

While some of the examples discussed with respect to FIGS. 4A-4B refer specifically to the sensor 405A and/or the sensor chip 410A, it should be understood that these examples can also apply to the sensor 405B and/or the sensor chip 410B. Likewise, while some of the examples discussed with respect to FIGS. 4A-4B refer to the feature detector and/or extractor 415A, the frame buffer for scale-space search 420A, the exposure and/or gain controller 425A, the rescaler 430A, and/or the descriptor matcher 435A, it should be understood that these examples can also apply to the feature detector and/or extractor 415B, the frame buffer for scale-space search 420B, the exposure and/or gain controller 425B, the rescaler 430B, and/or the descriptor matcher 435B. Likewise, while some of the examples discussed with respect to FIGS. 4A-4B refer to the sensor data 480A, the feature descriptors 485A, the feature locations 487A, the feature descriptors 490A, and/or the predicted feature locations 495A, it should be understood that these examples can also apply to the sensor data 480B, the feature descriptors 485B, the feature locations 487B, the feature descriptors 490B, and/or the predicted feature locations 495B.

In some examples, data traffic from the sensor chips 410A-410B to the analysis processor 440 (e.g., the feature descriptors 485A-485B and/or the feature locations 487A-487B) may use a MIPI protocol or an I3C protocol. In some examples, data traffic from the analysis processor 440 to the sensor chips 410A-410B (e.g., the feature descriptors 490A-490B and/or the predicted feature locations 495A-495B) may use a MIPI protocol or an I3C protocol.

In some examples, the sensor chip 410A and the sensor chip 410B are each a single chip, printed circuit board (PCB), other type of circuit board. In some examples, the sensor chip 410A and the sensor chip 410B can each include multiple chips, PCBs, circuit boards, or a combination thereof. While the sensor chip 410A and the sensor chip 410B are each referred to as chips, it should be understood that the sensor chip 410A and the sensor chip 410B can be collocated as part of a single chip, printed circuit board (PCB), other type of circuit board.

In some examples, use of a tracking system 400B with rescaling and/or feature detection/extraction and/or descriptor matching handed by the sensor chips 410A-410B while the analysis processor 440 handles stereo matching, IRLS, SLAM, and/or EFK achieves an 89.95% reduction in data bandwidth going to the analysis processor 440 over a system in which all of these functions are performed by the analysis processor 440. In such a tracking system 400B, the analysis processor 440 can send the feature descriptors 490A-490B of feature points (from the SLAM engine 465) that the analysis processor 440 expects to track in the current frame, along with the predicted locations 495A-495B of the features corresponding to the feature descriptors 490A-490B in the current frame, to each of the sensor chips 410A-410B. The sensor chips 410A-410B extract feature points and their descriptors in the current frame, that lie within the vicinity of the predicted feature locations 495A-495B obtained from the analysis processor 440. The sensor chips 410A-410B then compare the feature descriptors 490A-490B obtained from analysis processor 440 against the descriptors obtained from current frame within the vicinity of the predicted feature locations 495A-495B to efficiently locate the corresponding features in the current frame. The vicinity may correspond to a radius of a predetermined size (e.g., 1 pixel, 2 pixels, 3 pixels, 4 pixels, 5 pixels, 6 pixels, 7 pixels, 8 pixels, 9 pixels, 10 pixels, 11 pixels, 12 pixels, 13 pixels, 14 pixels, 15 pixels, 16 pixels, 17 pixels, 18 pixels, 19 pixels, 20 pixels, 21 pixels, 22 pixels, 23 pixels, 24 pixels, 25 pixels, or more than 25 pixels) around each of the predicted feature locations 495A-495B. The reduction in the bandwidth of data sent to the higher-powered analysis processor can reduce the amount of power used by the tracking system 400B compared to systems without sensor chips 410A-410B, which can extend the battery life of such systems and/or allow such systems to use smaller batteries.

Figure 5:
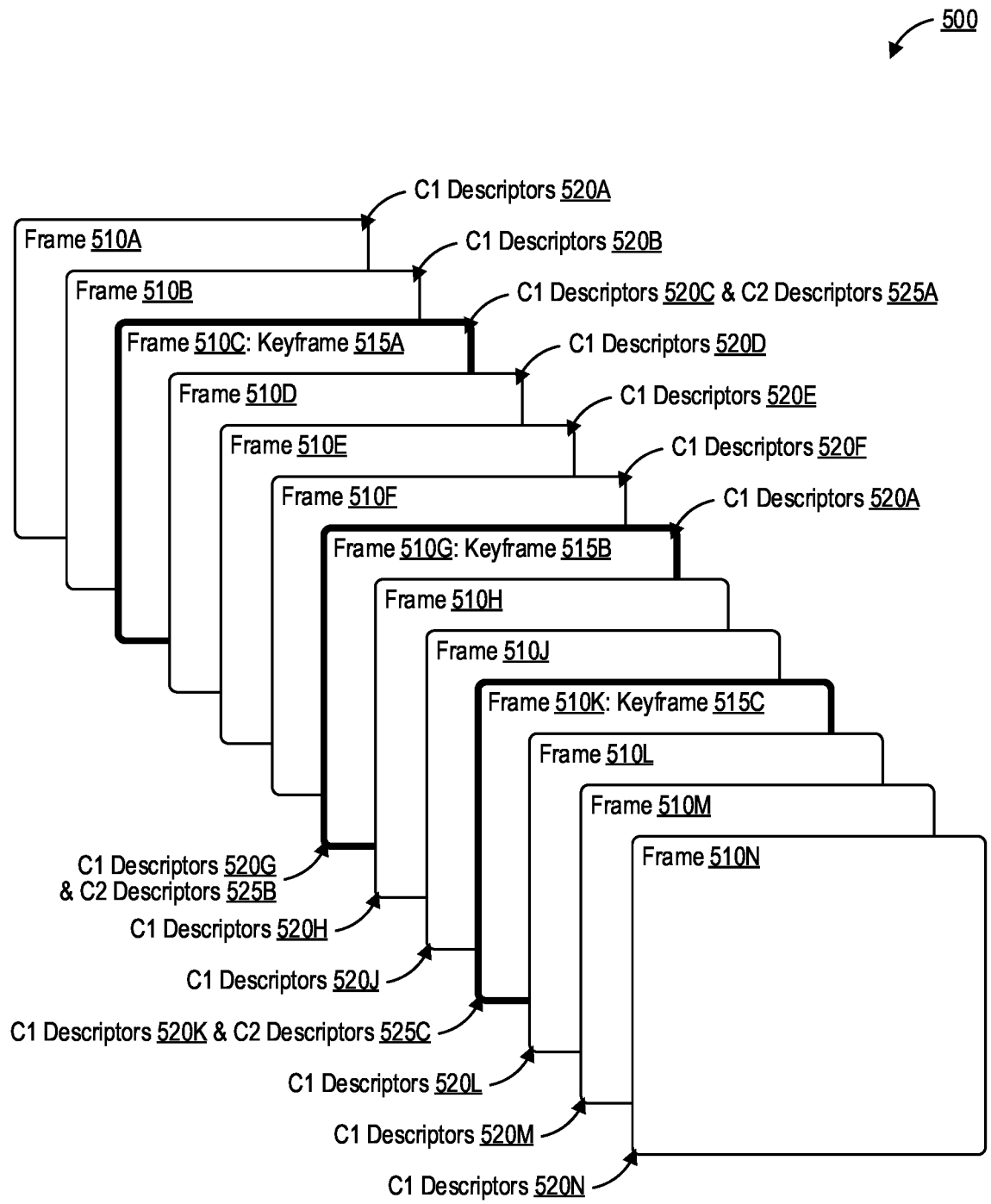
FIG. 5 is a conceptual diagram illustrating different types of descriptors used for features in different types of images.

FIG. 5 is a conceptual diagram 500 illustrating different types of descriptors used for features in different types of images. In particular, the conceptual diagram illustrates a series of sequential frames 510A-510N. Each of the frames 510A-510N includes corresponding C1 descriptors 520A-N. The series of sequential frames 510A-510N includes three keyframes. In particular, frame 510C is keyframe 515A, frame 510G is keyframe 515B, and frame 510K is keyframe 515C. These keyframes each have both C1 descriptors and C2 descriptors. In particular, keyframe 515A includes C1 descriptors 520C and C2 descriptors 525A, keyframe 515B includes C1 descriptors 520G and C2 descriptors 525B, and keyframe 515C includes C1 descriptors 520K and C2 descriptors 525C.

In some examples, the C1 descriptors 520A-520N and the C2 descriptors 525A-525C can be generated by the feature detector and/or extractor 415A-415B of the sensor chips 410A-410B of the tracking system 400A of FIG. 4A or of the tracking system 400B of FIG. 4B. The series of sequential frames 510A-510N can be referred to as a sequence of frames 510A-510N.

FIG. 6 is a conceptual diagram illustrating search for a feature in an image 600 based on a predicted feature location 630 for the feature. In some examples, the search for the feature illustrated in FIG. 6 can be performed by a descriptor matcher 435A-435B of one of the sensor chips 410A-410B of the tracking system 400B of FIG. 4B. For example, the sensor chip 410A can receive feature descriptors 490A and/or predicted feature locations 495A from the analysis processor 440. The sensor chip 410A can select one of the feature descriptors 490A and the corresponding one of the predicted feature locations 495A. The selected one of the predicted feature locations 495A is the predicted feature location 630, which is illustrated as a black-shaded star in FIG. 6. The descriptor matcher 435A of the sensor chip 410A searches for a feature matching the selected feature description within a search range 620 around the predicted feature location 630. The search range 620 may be a circle with a predetermined radius. For instance, the predetermined radius may be 1 pixel, 2 pixels, 3 pixels, 4 pixels, 5 pixels, 6 pixels, 7 pixels, 8 pixels, 9 pixels, 10 pixels, 11 pixels, 12 pixels, 13 pixels, 14 pixels, 15 pixels, 16 pixels, 17 pixels, 18 pixels, 19 pixels, 20 pixels, 21 pixels, 22 pixels, 23 pixels, 24 pixels, 25 pixels, more than 25 pixels, a length longer than 25 pixels, or a length in between any two previously-listed lengths. The search range 620 is illustrated in FIG. 6 as a circled shaded in with a dotted pattern.

The descriptor matcher 435A, the feature detector and/or extractor 415B, or both find three detected features 610 within the search range 620. The feature detector and/or extractor 415B can generate descriptors for the three detected features 610. The descriptor matcher 435A can identify whether one of the three detected features 610 matches the selected one of the feature descriptors 490A. If so, the descriptor matcher 435A identifies the feature location of the feature within the image 600, and reports the feature location of the feature to the analysis processor 440 as part of the feature locations 487A.

While the above example is discussed with respect to the sensor 405A, the sensor chip 410A, the feature descriptors 490A, the predicted feature locations 495A, the feature detector and/or extractor 415B, and the descriptor matcher 435A, it should be understood that the above example can also apply to the sensor 405B, the sensor chip 410B, the feature descriptors 490B, the predicted feature locations 495B, the feature detector and/or extractor 415B, and the descriptor matcher 435B.

Figure 7A:
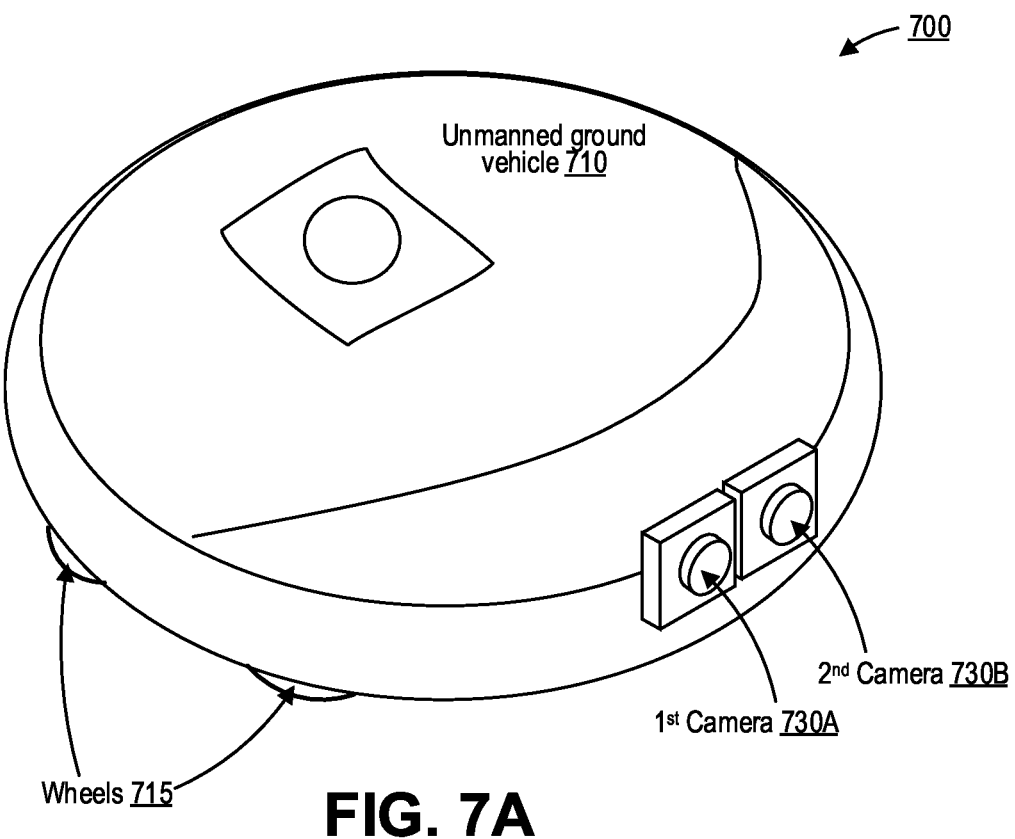
FIG. 7A is a perspective diagram illustrating an unmanned ground vehicle (UGV) that performs feature tracking and/or visual simultaneous localization and mapping (VSLAM), in accordance with some examples.

FIG. 7A is a perspective diagram 700 illustrating an unmanned ground vehicle (UGV) 710 that performs feature tracking and/or visual simultaneous localization and mapping (VSLAM), in accordance with some examples. The UGV 710 illustrated in the perspective diagram 700 of FIG. 7A may be an example of a SLAM system 300, a tracking system 400A, and/or a tracking system 400B. The UGV 710 includes a first camera 730A and a second camera 730B along a front surface of the UGV 710. The first camera 730A and a second camera 730B may be two of the one or more cameras 310. The first camera 730A and the second camera 730B may be the sensor 405A and the sensor 405B, respectively. In some examples, the UGV 710 may include one or more additional cameras in addition to the first camera 730A and the second camera 730B. In some examples, the UGV 710 may include one or more additional sensors in addition to the first camera 730A and the second camera 730B. The UGV 710 includes multiple wheels 715 along a bottom surface of the UGV 710. The wheels 715 may act as a conveyance of the UGV 710, and may be motorized using one or more motors that may be actuated by a movement actuator of the UGV 710. The movement actuator, the motors, and thus the wheels 715, may be actuated to move the UGV 710 along a path.

Figure 7B:
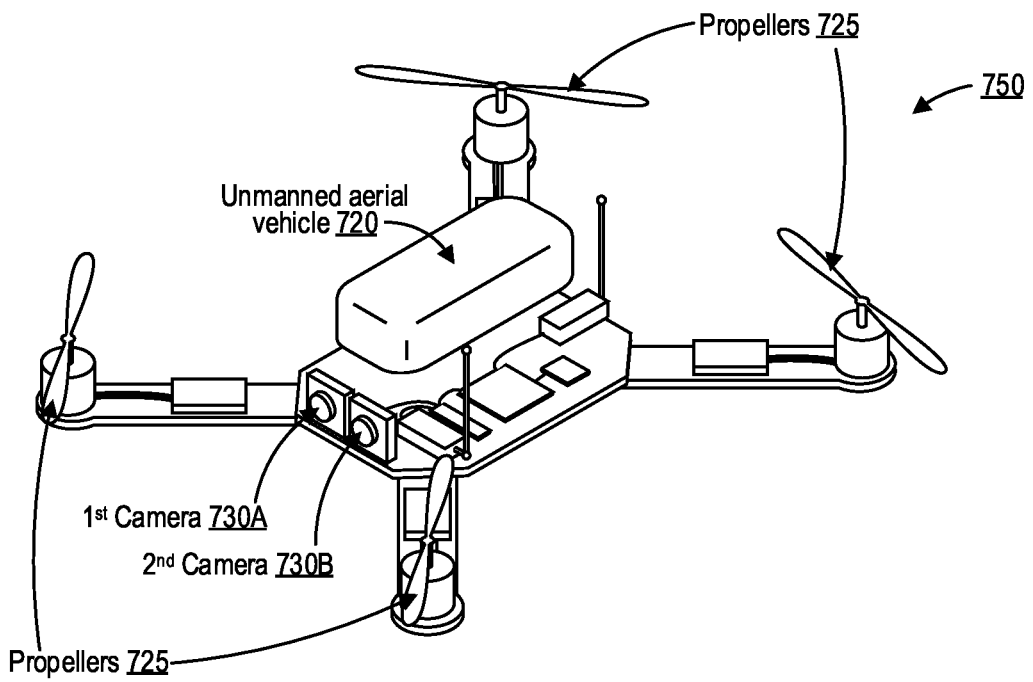
FIG. 7B is a perspective diagram illustrating an unmanned aerial vehicle (UAV) that performs feature tracking and/or visual simultaneous localization and mapping (VSLAM), in accordance with some examples.

FIG. 7B is a perspective diagram 750 illustrating an unmanned aerial vehicle (UAV) 720 that performs feature tracking and/or visual simultaneous localization and mapping (VSLAM), in accordance with some examples. The UAV 720 illustrated in the perspective diagram 750 of FIG. 7B may be an example of a SLAM system 300, a tracking system 400A, and/or a tracking system 400B. The UAV 720 includes a first camera 730A and a second camera 730B along a front portion of a body of the UAV 720. The first camera 730A and a second camera 730B may be two of the one or more cameras 310. The first camera 730A and the second camera 730B may be the sensor 405A and the sensor 405B, respectively. In some examples, the UAV 720 may include one or more additional cameras in addition to the first camera 730A and the second camera 730B. In some examples, the UAV 720 may include one or more additional sensors in addition to the first camera 730A and the second camera 730B. The UAV 720 includes multiple propellers 725 along the top of the UAV 720. The propellers 725 may be spaced apart from the body of the UAV 720 by one or more appendages to prevent the propellers 725 from snagging on circuitry on the body of the UAV 720 and/or to prevent the propellers 725 from occluding the view of the first camera 730A and/or the second camera 730B. The propellers 725 may act as a conveyance of the UAV 720, and may be motorized using one or more motors that may be actuated by a movement actuator of the UAV 720. The movement actuator, the motors, and thus the propellers 725, may be actuated to move the UAV 720 along a path.

Where the SLAM system 300 or a tracking system 400A/400B with a SLAM engine 465 is a vehicle, such as the UGV 710 or UAV 720, the SLAM system 300 may include a path planning engine and/or a movement actuator. The path planning engine may generate a path along which the vehicle is to move. In some examples, path planning engine may use a Dijkstra algorithm to plan the path. In some examples, the path planning engine may include stationary obstacle avoidance and/or moving obstacle avoidance in planning the path. In some examples, the path planning engine may include determinations as to how to best move the vehicle from a first pose to a second pose in planning the path. In some examples, the path planning engine may plan a path that is optimized to reach and observe every portion of a first region of an environment (e.g., a first set of one or more rooms in the environment) before moving on to a second region of the environment (e.g., the second set of one or more rooms of the environment) in planning the path. In some examples, the path planning engine may plan a path that is optimized to reach and observe a predetermined set of rooms in an environment (e.g., every room in the environment) as quickly as possible. In some examples, the path planning engine may plan a path that returns to a previously-observed room to observe a particular feature again to improve one or more map points corresponding the feature in the local map and/or global map (e.g., to perform a loop closure). In some examples, the path planning engine may plan a path that returns to a previously-observed room to observe a portion of the previously-observed room that lacks map points in the local map and/or global map to see if any features can be observed in that portion of the room. The movement actuator may actuate one or more motors to actuate a motorized conveyance (e.g., the wheels 715 or the propellers 725) to move the vehicle along the path planned by the path planning engine.

Figure 8A:
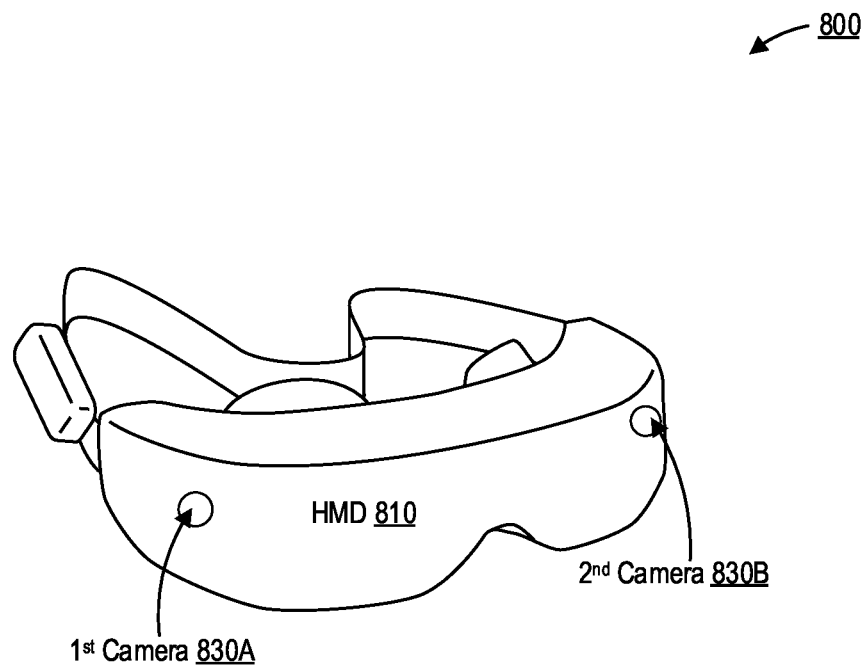
FIG. 8A is a perspective diagram illustrating a head-mounted display (HMD) that performs feature tracking and/or visual simultaneous localization and mapping (VSLAM), in accordance with some examples.

FIG. 8A is a perspective diagram 800 illustrating a head-mounted display (HMD) 810 that performs feature tracking and/or visual simultaneous localization and mapping (VSLAM), in accordance with some examples. The HMD 810 may be, for example, an augmented reality (AR) headset, a virtual reality (VR) headset, a mixed reality (MR) headset, an extended reality (XR) headset, or some combination thereof. The HMD 810 may be an example of an XR system 200, a SLAM system 300, a tracking system 400A, a tracking system 400B, or a combination thereof. The HMD 810 includes a first camera 830A and a second camera 830B along a front portion of the HMD 810. The first camera 830A and the second camera 830B may be two of the one or more cameras 210. The first camera 830A and the second camera 830B may be the sensor 405A and the sensor 405B, respectively. In some examples, the HMD 810 may only have a single camera. In some examples, the HMD 810 may include one or more additional cameras in addition to the first camera 830A and the second camera 830B. In some examples, the HMD 810 may include one or more additional sensors in addition to the first camera 830A and the second camera 830B.

Figure 8B:
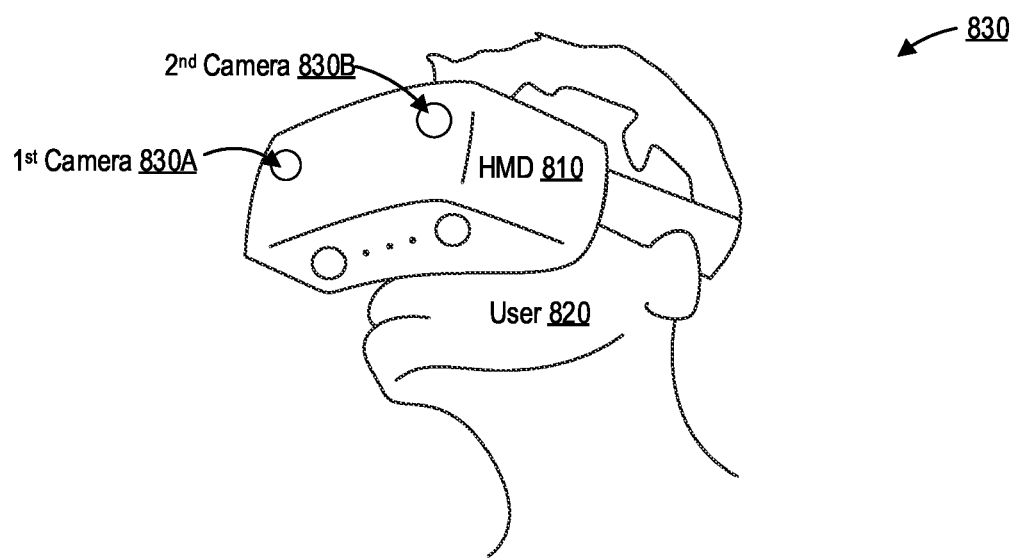
FIG. 8B is a perspective diagram illustrating the head-mounted display (HMD) of FIG. 7A being worn by a user, in accordance with some examples.

FIG. 8B is a perspective diagram 830 illustrating the head-mounted display (HMD) 810 of FIG. 8A being worn by a user 820, in accordance with some examples. The user 820 wears the HMD 810 on the user 820's head over the user 820's eyes. The HMD 810 can capture images with the first camera 830A and the second camera 830B. In some examples, the HMD 810 displays one or more display images toward the user 820's eyes that are based on the images captured by the first camera 830A and the second camera 830B. The display images may provide a stereoscopic view of the environment, in some cases with information overlaid and/or with other modifications. For example, the HMD 810 can display a first display image to the user 820's right eye, the first display image based on an image captured by the first camera 830A. The HMD 810 can display a second display image to the user 820's left eye, the second display image based on an image captured by the second camera 830B. For instance, the HMD 810 may provide overlaid information in the display images overlaid over the images captured by the first camera 830A and the second camera 830B.

The HMD 810 includes no wheels 715, propellers 725, or other conveyance of its own. Instead, the HMD 810 relies on the movements of the user 820 to move the HMD 810 about the environment. Thus, in some cases, the HMD 810, when performing a SLAM technique, can skip path planning using a path planning engine and/or movement actuation using the movement actuator. In some cases, the HMD 810 can still perform path planning using a path planning engine, and can indicate directions to follow a suggested path to the user 820 to direct the user along the suggested path planned using the path planning engine. In some cases, for instance where the HMD 810 is a VR headset, the environment may be entirely or partially virtual. If the environment is at least partially virtual, then movement through the virtual environment may be virtual as well. For instance, movement through the virtual environment can be controlled by an input device 205. The movement actuator may include any such input device 205. Movement through the virtual environment may not require wheels 715, propellers 725, legs, or any other form of conveyance. If the environment is a virtual environment, then the HMD 810 can still perform path planning using the path planning engine and/or movement actuation. If the environment is a virtual environment, the HMD 810 can perform movement actuation using the movement actuator by performing a virtual movement within the virtual environment. Even if an environment is virtual, SLAM techniques may still be valuable, as the virtual environment can be unmapped and/or may have been generated by a device other than the HMD 810, such as a remote server or console associated with a video game or video game platform. In some cases, feature tracking and/or SLAM may be performed in a virtual environment even by vehicle or other device that has its own physical conveyance system that allows it to physically move about a physical environment. For example, SLAM may be performed in a virtual environment to test whether a SLAM system 300, tracking system 400A, and/or tracking system 400B is working properly without wasting time or energy on movement and without wearing out a physical conveyance system.

Figure 9A:
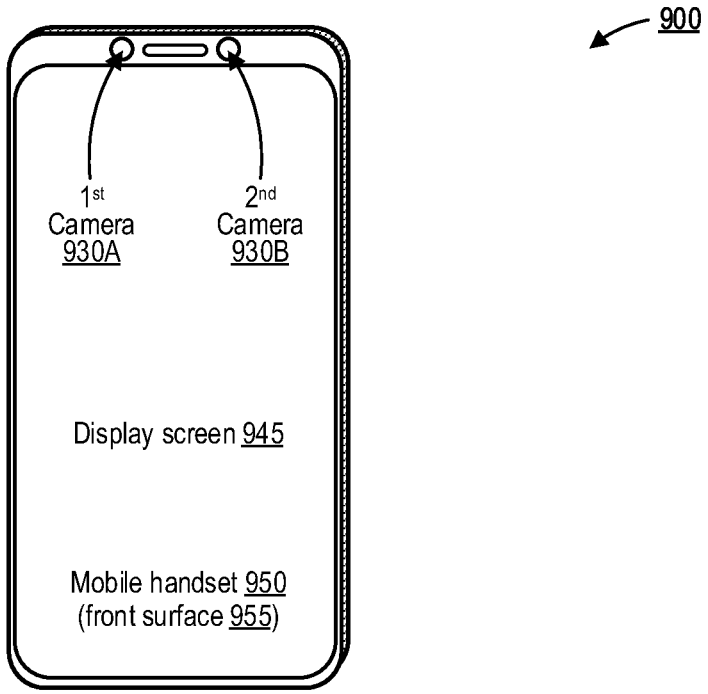
FIG. 9A is a perspective diagram illustrating a front surface of a mobile handset that performs feature tracking and/or visual simultaneous localization and mapping (VSLAM) using one or more front-facing cameras, in accordance with some examples.

FIG. 9A is a perspective diagram 900 illustrating a front surface 955 of a mobile device 950 that performs feature tracking and/or visual simultaneous localization and mapping (VSLAM) using one or more front-facing cameras 930A-B, in accordance with some examples. The mobile device 950 may be an example of a XR system 200, a SLAM system 300, a tracking system 400A, a tracking system 400B, or a combination thereof. The mobile device 950 may be, for example, a cellular telephone, a satellite phone, a portable gaming console, a music player, a health tracking device, a wearable device, a wireless communication device, a laptop, a mobile device, any other type of computing device or computing system 1100 discussed herein, or a combination thereof. The front surface 955 of the mobile device 950 includes a display screen 945. The front surface 955 of the mobile device 950 includes a first camera 930A and a second camera 930B. The first camera 930A and the second camera 930B are illustrated in a bezel around the display screen 945 on the front surface 955 of the mobile device 950. In some examples, the first camera 930A and the second camera 930B can be positioned in a notch or cutout that is cut out from the display screen 945 on the front surface 955 of the mobile device 950. In some examples, the first camera 930A and the second camera 930B can be under-display cameras that are positioned between the display screen 945 and the rest of the mobile device 950, so that light passes through a portion of the display screen 945 before reaching the first camera 930A and the second camera 930B. The first camera 930A and the second camera 930B of the perspective diagram 900 are front-facing cameras. The first camera 930A and the second camera 930B face a direction perpendicular to a planar surface of the front surface 955 of the mobile device 950. The first camera 930A and the second camera 930B may be two of the one or more cameras 310. The first camera 930A and the second camera 930B may be the sensor 405A and the sensor 405B, respectively. In some examples, the front surface 955 of the mobile device 950 may only have a single camera. In some examples, the mobile device 950 may include one or more additional cameras in addition to the first camera 930A and the second camera 930B. In some examples, the mobile device 950 may include one or more additional sensors in addition to the first camera 930A and the second camera 930B.

Figure 9B:
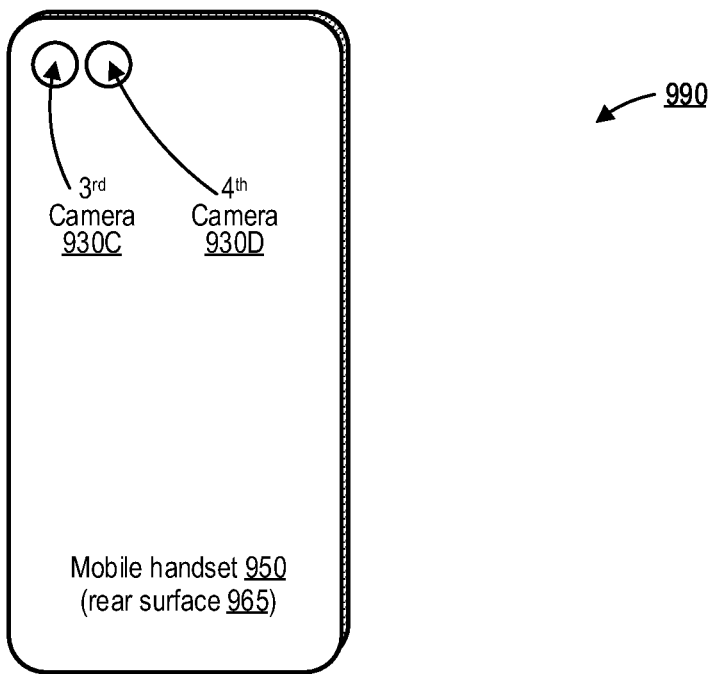
FIG. 9B is a perspective diagram illustrating a rear surface of a mobile handset that performs feature tracking and/or visual simultaneous localization and mapping (VSLAM) using one or more rear-facing cameras, in accordance with some examples.

FIG. 9B is a perspective diagram 990 illustrating a rear surface 965 of a mobile device 950 that performs feature tracking and/or visual simultaneous localization and mapping (VSLAM) using one or more rear-facing cameras 930C-D, in accordance with some examples. The mobile device 950 includes a third camera 930C and a fourth camera 930D on the rear surface 965 of the mobile device 950. The third camera 930C and the fourth camera 930D of the perspective diagram 990 are rear-facing. The third camera 930C and the fourth camera 930D face a direction perpendicular to a planar surface of the rear surface 965 of the mobile device 950. While the rear surface 965 of the mobile device 950 does not have a display screen 945 as illustrated in the perspective diagram 990, in some examples, the rear surface 965 of the mobile device 950 may have a second display screen. If the rear surface 965 of the mobile device 950 has a display screen 945, any positioning of the third camera 930C and the fourth camera 930D relative to the display screen 945 may be used as discussed with respect to the first camera 930A and the second camera 930B at the front surface 955 of the mobile device 950. The third camera 930C and the fourth camera 930D may be two of the one or more cameras 310. The third camera 930C and the fourth camera 930D may be the sensor 405A and the sensor 405B, respectively. In some examples, the rear surface 965 of the mobile device 950 may only have a single camera. In some examples, the mobile device 950 may include one or more additional cameras in addition to the first camera 930A, the second camera 930B, the third camera 930C, and the fourth camera 930D. In some examples, the mobile device 950 may include one or more additional sensors in addition to the first camera 930A, the second camera 930B, the third camera 930C, and the fourth camera 930D.

Like the HMD 810, the mobile device 950 includes no wheels 715, propellers 725, or other conveyance of its own. Instead, the mobile device 950 relies on the movements of a user holding or wearing the mobile device 950 to move the mobile device 950 about the environment. Thus, in some cases, the mobile device 950, when performing a SLAM technique, can skip path planning using the path planning engine and/or movement actuation using the movement actuator. In some cases, the mobile device 950 can still perform path planning using the path planning engine, and can indicate directions to follow a suggested path to the user to direct the user along the suggested path planned using the path planning engine. In some cases, for instance where the mobile device 950 is used for AR, VR, MR, or XR, the environment may be entirely or partially virtual. In some cases, the mobile device 950 may be slotted into a head-mounted device (HMD) (e.g., into a cradle of the HMD) so that the mobile device 950 functions as a display of the HMD, with the display screen 945 of the mobile device 950 functioning as the display of the HMD. If the environment is at least partially virtual, then movement through the virtual environment may be virtual as well. For instance, movement through the virtual environment can be controlled by one or more joysticks, buttons, video game controllers, mice, keyboards, trackpads, and/or other input devices that are coupled in a wired or wireless fashion to the mobile device 950. The movement actuator may include any such input device. Movement through the virtual environment may not require wheels 715, propellers 725, legs, or any other form of conveyance. If the environment is a virtual environment, then the mobile device 950 can still perform path planning using the path planning engine and/or movement actuation. If the environment is a virtual environment, the mobile device 950 can perform movement actuation using the movement actuator by performing a virtual movement within the virtual environment.

Figure 10:
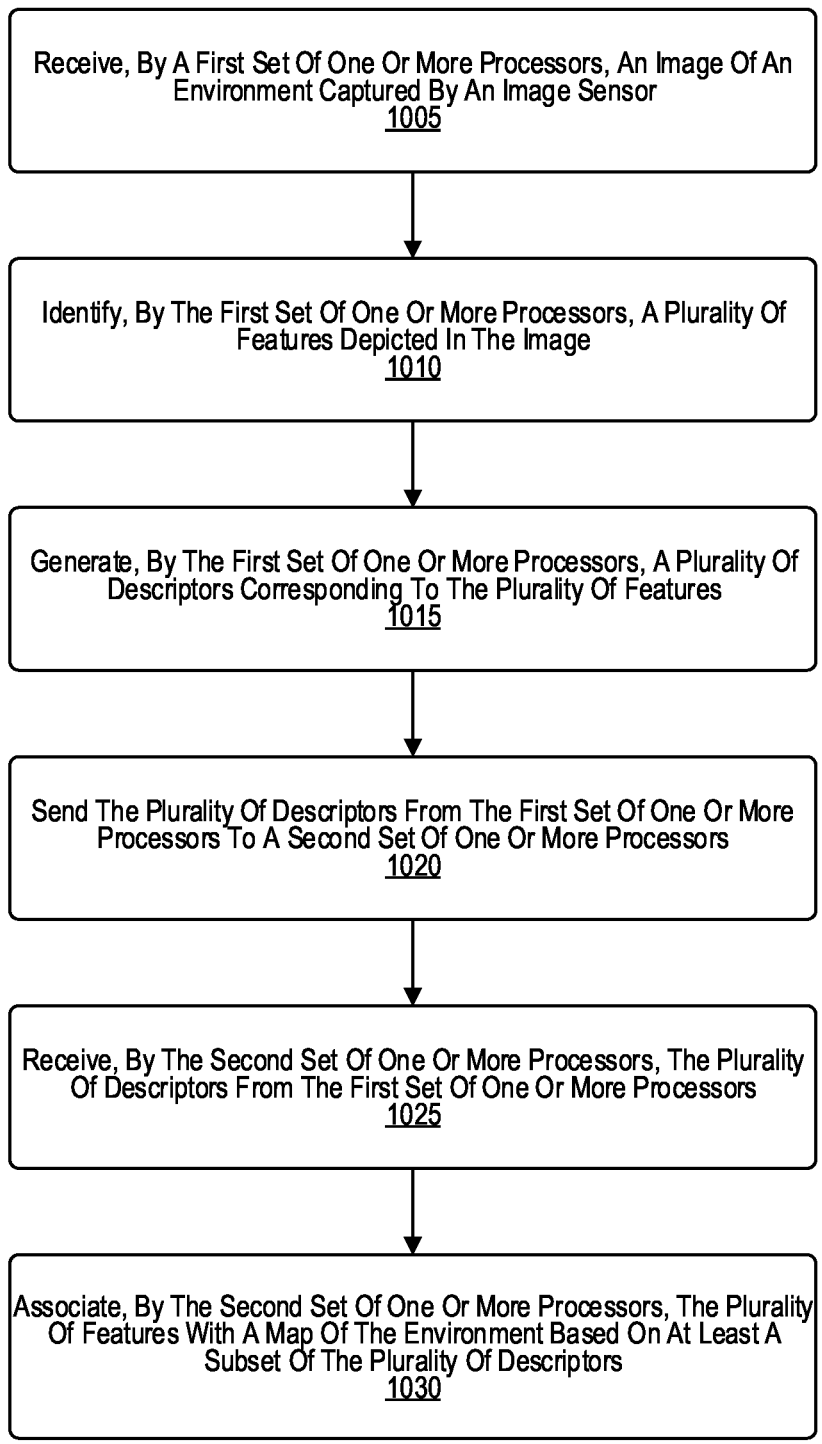
FIG. 10 is a flow diagram illustrating an example of an image processing technique, in accordance with some examples.

FIG. 10 is a flow diagram illustrating an example of a process 1000 implementing an image processing technique, in accordance with some examples. The image processing process 1000 of FIG. 10 may be performed by an image processing system. The image processing system may be, and/or may include, at least an image capture and processing system 100, an image capture device 105A, an image processing device 105B, an XR system 200, a SLAM system 300, a tracking system 400A, a tracking system 400B, an unmanned ground vehicle (UGV) 710, an unmanned aerial vehicle (UAV) 720, a head-mounted display (HMD) 810, a mobile device 950, a computing system 1100, any component or element of any of the previously-listed devices, any other type of device or device component mentioned herein, or some combination thereof.

At operation 1005, the image processing system receives, by and/or at a first set of one or more processors, an image of an environment captured by an image sensor. In one illustrative example, the first set of one or more processors can include the one or more sensor processors (of sensor chip 410A and/or sensor chip 410B) of the tracking system 400A of FIG. 4A and/or of the tracking system 400B of FIG. 4B. For instance, the sensor chip 410A can receive the image as part of the sensor data 480A from the sensor 405A. In another illustrative example, the image sensor can be an example of the sensors 305 of FIG. 3, and the image of the environment can be part of the sensor data 365 of FIG. 3. The first set of one or more processors can include the VIO Tracker 315, the mapping engine 330, and/or the relocalization engine 355 of FIG. 3. The first set of one or more processors can be connected to the image sensor through an electrical connection, such as a wired connection. In some examples, the first set of one or more processors and the image sensor are part of a single device. The first set of one or more processors can be connected to the image sensor through a wireless connection. In some examples, the first set of one or more processors are part of a first device, while the image sensor is part of a second device that can connect to the first device.

At operation 1010, the image processing system identifies, by and/or at the first set of one or more processors, a plurality of features depicted in the image. Referring to FIG. 4A and/or FIG. 4B as illustrative examples, the sensor chip 410A can detect and/or extract features (e.g., using the feature detector and/or extractor 415A) from an image that the sensor chip 410A receives as part of the sensor data 480A from the sensor 405A. The feature detector and/or extractor 415A can use various types of feature extraction techniques, such as those described herein. Referring to FIG. 3 as an illustrative example, the VIO tracker 315 is an example of a processor that can detect and/or extract features from an image in the sensor data 365 that the VIO tracker 315 receives, for instance using the feature tracking engine 320.

At operation 1015, the image processing system generates, by and/or at the first set of one or more processors, a plurality of descriptors corresponding to the plurality of features. For example, using the feature detector and/or extractor 415A, the sensor chip 410A can generate descriptors for the features, as described above. Similarly, the feature tracking engine 320 of the VIO tracker 315 can generate descriptors for features in the sensor data 365 as described above. In some cases, a descriptor for a feature may be generated at least in part by extracting a local image patch around the feature, and determining or obtaining a description of the feature as depicted in the local image patch. In some examples, the feature descriptor describes the feature as a collection of one or more feature vectors.

As discussed herein, each of the plurality of descriptors can be of a particular descriptor type. The particular descriptor type can be one of multiple possible descriptor types. For instance, the possible descriptor types can include at least two possible descriptor types, which can be identified as a first descriptor type and a second descriptor type. In an illustrative example, the feature detector and/or extractor 415A/415B can generate descriptors having a low complexity for features in images that are not keyframes. These low-complexity descriptors can be referred to as C1 descriptors, or as descriptors of the second descriptor type. On the other hand, the feature detector and/or extractor 415A/415B can generate descriptors having a high complexity for features in images that are keyframes. These high-complexity descriptors can be referred to as C2 descriptors, or as descriptors of the first descriptor type. For a particular sequence of image frames such as the sequence of image frames 510A-510N of FIG. 5, the feature detector and/or extractor 415A/415B can generate only descriptors of the second descriptor type (C1) for some of the image frames 510A-510N. The feature detector and/or extractor 415A/415B can generate descriptors of the second descriptor type (C1) and/or of the first descriptor type (C2) for some of the image frames 510A-510N.

At operation 1020, the image processing system sends the plurality of descriptors from the first set of one or more processors to a second set of one or more processors. At operation 1025, the image processing system receives, by and/or at the second set of one or more processors, the plurality of descriptors from the first set of one or more processors. In one illustrative example, the first set of one or more processors can include the sensor processor(s) of the sensor chip 410A and/or the sensor chip 410B of the tracking system 400A of FIG. 4A and/or the tracking system 400B of FIG. 4B. In one illustrative example, the second set of one or more processors can include the analysis processor 440 of the tracking system 400A of FIG. 4A and/or the tracking system 400B of FIG. 4B. For instance, the sensor chip 410A can send feature descriptors 485A to the analysis processor 440, which the one or more analysis processors 440 can receive. In another example, the sensor chip 410A and the sensor chip 410B can send feature descriptors 485A and 485B, respectively, to the analysis processor 440.

In some examples, the second set of one or more processors are more powerful than the first set of one or more processors. For instance, the second set of one or more processors can have a higher average clock speed than the first set of one or more processors. The second set of one or more processors can use power at a higher rate than the first set of one or more processors. In some examples, the first set of one or more processors and the second set of one or more processors can be part of a single image processing device. The tracking system 400A and/or the tracking system 400B can be examples of such an image processing device. The first set of one or more processors and the second set of one or more processors can be connected through an electrical connection, such as a wired connection. In some examples, the first set of one or more processors can be part of a first image processing device, and the second set of one or more processors can be part of a second image processing device. The first image processing device and the second image processing device can be connected through an electrical connection, such as a wired connection. The first image processing device and the second image processing device can be connected through a wireless connection.

In some examples, the first set of one or more processors sends the plurality of descriptors to the second set of one or more processors over an electrical connection, and/or the second set of one or more processors receive the plurality of descriptors from the first set of one or more processors over the electrical connection. In some examples, the first set of one or more processors sends the plurality of descriptors to the second set of one or more processors over a wireless connection, and/or the second set of one or more processors receive the plurality of descriptors from the first set of one or more processors over the wireless connection.

At operation 1030, the image processing system associates, by or at the second set of one or more processors, the plurality of features with a map of the environment based on at least a subset of the plurality of descriptors. In one illustrative example, to associate the plurality of features with the map of the environment based on at least the subset of the plurality of descriptors, the second set of one or more processors orients the plurality of features relative to the map of the environment based on at least the subset of the plurality of descriptors. In one illustrative example, associating the plurality of features with the map of the environment based on at least a subset of the plurality of descriptors can include VIO tracking as discussed with respect to the VIO tracker 315 of FIG. 3, map processing as discussed with respect to the mapping engine 330 of FIG. 3, relocalization as discussed with respect to the relocalization engine 355 of FIG. 3, other operations discussed with respect to the SLAM system 300 any component thereof, or a combination thereof. In some examples, associating the plurality of features with the map of the environment based on at least a subset of the plurality of descriptors can be based on at least a subset of the feature descriptors 485A, the feature locations 487A, the feature descriptors 485B, and/or the feature locations 487B of FIG. 4A and/or FIG. 4B. In one illustrative example, associating the plurality of features with the map of the environment based on at least a subset of the plurality of descriptors can include frame to frame matching as discussed with respect to the frame to frame matcher 450 of FIGS. 4A-4B, stereo matching as discussed with respect to the stereo matcher 455 of FIGS. 4A-4B, pose and/or trajectory tracking as discussed with respect to the IRLS engine 460 of FIGS. 4A-4B, localization and/or mapping as discussed with respect to the SLAM engine 465 of FIGS. 4A-4B, pose and/or trajectory tracking as discussed with respect to the EKF 470 of FIGS. 4A-4B, other operations discussed with respect to the DSP 445 or any component thereof, other operations discussed with respect to the analysis processor 440 or any component thereof, or a combination thereof.

In some examples, to associate the plurality of features with the map of the environment, the second set of one or more processors can track at least a subset of the plurality of features based on at least the subset of the plurality of descriptors and feature information corresponding to one or more additional images of the environment. The feature information corresponding to the one or more additional images of the environment can include one or more other descriptors for at least the subset of the plurality of features. The one or more other descriptors can be based on one or more depictions of at least the subset of the plurality of features in the one or more additional images. In some examples, the first set of one or more processors can generate at least one of the one or more other descriptors in response to receipt of at least one of the one or more additional images. In one illustrative example referring to FIG. 4A, the frame-to-frame matcher 450 can track a subset of the features for which the analysis processor 440 receives feature descriptors 485A-485B and/or feature locations 487A-487B. For instance, the sensor chips 410A and 410B can extract a number (e.g., 1000, 3000, etc.) feature descriptors per frame, and the frame-to-frame matcher 450 can determine matches in other images for (thus tracking) a smaller number of features (e.g., 250 features, 1000 features, etc.). In some examples, the frame-to-frame matcher 450 can perform descriptor matching to determine matches in other images for a particular feature, as described above. In some cases, the frame-to-frame matcher 450 can determine that a feature descriptor in a first set of feature descriptors that matches, or that shares at least a threshold degree of similarity with, a feature descriptor in a second set of feature descriptors describes the same feature. The frame-to-frame matcher 450 and track the matching features (that are determined to be the same).

In some examples, the first set of one or more processors can identify feature locations of the plurality of features and send the feature locations to the second set of one or more processors. In one illustrative example, the feature locations can include the feature locations 487A (from the sensor chip 410A) and/or the feature locations 487B (from the sensor chip 410B). The second set of one or more processors (e.g., the analysis processor 440) can receive the feature locations (e.g., feature locations 487A and/or feature locations 487B) from the first set of one or more processors (e.g., from the one or more processors of sensor chip 410A and/or sensor chip 410B). Associating the plurality of features with the map of the environment can be based on the feature locations. The plurality of features can include a first feature. The second set of one or more processors can generate a predicted location of the first feature based on one or more additional images that depict the first feature. In one illustrative example, the predicted location can include a predicted feature location from the predicted feature location(s) 495A and/or the predicted feature location(s) 495B discussed with respect to FIG. 4A. The second set of one or more processors can send the predicted location of the first feature to the first set of one or more processors (e.g., by sending one of the predicted feature location(s) 495A and/or the predicted feature location(s) 495B, as shown in FIG. 4B). To identify the feature locations, the first set of one or more processors can identify a first feature location of the first feature based on the predicted location of the first feature. In one illustrative example, the identification of the feature location based on the predicted feature location can be performed by the descriptor matchers 435A-435B of the sensor chips 410A-410B of the tracking system 400B of FIG. 4B. In one illustrative example, the predicted feature location can include a predicted feature location 630 of FIG. 6. The first set of one or more processors can identify the first feature location to be one of the detected features 610 in the search range 620 around the predicted feature location 630.

In some examples, the image processing system associates the plurality of features with the map of the environment based on at least a subset of the plurality of descriptors using the first set of one or more processors instead of or in addition to the second set of one or more processors. For instance, at least a portion of the associating of the plurality of features with the map of the environment based on at least a subset of the plurality of descriptors can be performed by the descriptor matchers 435A-435B of the sensor chips 410A-410B of the tracking system 400B of FIG. 4B.

In some examples, at least a subset of the one or more additional images can be captured by the image sensor before the image sensor captures the image of operation 1005. For instance, if the image received at operation 1005 is the frame 510G of FIG. 5, then the one or more additional images can include at least a subset of frames 510A-510F of FIG. 5. In some examples, at least a subset of the one or more additional images can be captured by the image sensor after the image sensor captures the image received at operation 1005. For instance, if the image received at operation 1005 is the frame 510G of FIG. 5, then the one or more additional images can include at least a subset of frames 510H-510N of FIG. 5. In some examples, at least a subset of the one or more additional images can be captured by a second image sensor (other than the image sensor of operation 1005) before, contemporaneously, and/or after the image sensor captures the image of operation 1005. For instance, if the image received at operation 1005 is an image in the sensor data 480A captured by the sensor 405A of FIG. 4A and/or FIG. 4B, then the one or more additional images can be images in the sensor data 480B captured by the sensor 405B of FIG. 4A and/or FIG. 4B. If the image received at operation 1005 is an image captured by the first camera 730A of FIG. 7A and/or FIG. 7B, then the one or more additional images can be images captured by the second camera 730B of FIG. 7A and/or FIG. 7B. If the image received at operation 1005 is an image captured by the first camera 830A of FIG. 8A and/or FIG. 8B, then the one or more additional images can be images captured by the second camera 830B of FIG. 8A and/or FIG. 8B. If the image received at operation 1005 is an image captured by the first camera 930A of FIG. 9A, then the one or more additional images can be images captured by the second camera 930B of FIG. 9A. If the image received at operation 1005 is an image captured by the third camera 930C of FIG. 9B, then the one or more additional images can be images captured by the fourth camera 930D of FIG. 9B.

The plurality of features can include a first feature. In some examples, the second set of one or more processors can identify a predicted location (e.g., predicted feature location 487A and/or predicted feature location 487B and/or predicted feature location 460) of the first feature based on one or more stored descriptors corresponding to the first feature stored in the map of the environment. In some examples, the first feature descriptor can be based on one or more additional images depicting the first feature. The second set of one or more processors can send the predicted location of the first feature to the first set of one or more processors. The analysis engine 440 sending the predicted feature locations 495A-495B to the sensor chips 410A-410B in the tracking system 400B of FIG. 4B are an example of the second set of one or more processors sending the predicted location of the first feature to the first set of one or more processors. The first set of one or more processors can identify a first feature location of the first feature based on the predicted location of the first feature as a part of identifying the feature locations. For instance, the first set of one or more processors can identify the first feature location to be one of the detected features 610 in the search range 620 around the predicted feature location 630. In some examples, the identification of the feature location based on the predicted feature location can be performed by the descriptor matchers 435A-435B of the sensor chips 410A-410B of the tracking system 400B of FIG. 4B.

In one illustrative example referring to the tracking system 400A of FIG. 4A and the tracking system 400B of FIG. 4B, the analysis processor 440 can send the feature descriptors 490A-490B of feature points (e.g., from the SLAM engine 465) that the analysis processor 440 expects to track in the current frame to the sensor chip 410A and/or the sensor chip 410B. The analysis process 440 can also send the predicted locations 495A-495B of the features corresponding to the feature descriptors 490A-490B in the current frame to the sensor chip 410A and/or the sensor chip 410B. The sensor chip 410A and/or the sensor chip 410B can extract the feature points and their descriptors in the current frame that lie within the vicinity of the predicted feature locations 495A-495B obtained from the analysis processor 440. The sensor chips 410A-410B can locate the corresponding features in the current frame at least in part by comparing the feature descriptors 490A-490B obtained from analysis processor 440 against the descriptors obtained from current frame within the vicinity (e.g., search range 620) of the predicted feature locations 495A-495B.

In some examples, the plurality of descriptors include one or more descriptors of a first descriptor type of a plurality of descriptor types based on the image being a keyframe. The first descriptor type can have a higher complexity than at least a second descriptor type of the plurality of descriptor types. For instance, the C2 descriptors described with respect to FIGS. 4A-4B and FIG. 5 can be examples of the first descriptor type. To associate the plurality of features with the map of the environment, the second set of one or more processors can perform relocalization based on the one or more descriptors of the first descriptor type. Due to their higher complexity compared to descriptors of the second descriptor type, the descriptors of the first descriptor type can include more information about the feature and/or the surroundings of the feature than descriptors of the second descriptor type. For instance, descriptors of the first descriptor type can include information about a larger local path around a feature than descriptors of the second descriptor type. Descriptors of the first descriptor type can include information at a higher resolution than descriptors of the second descriptor type. The increased amount of information for descriptors of the first descriptor type can make it possible to find matches for a feature when the image processing system does not know, or is uncertain of, its location and/or pose within the environment, and must search more broadly through descriptors for features in the map of the environment to perform relocalization. The increased amount of information for descriptors of the first descriptor type can help to match features even if those features are depicted as captured from a different camera pose (e.g., angle and/or orientation and/or position) in one frame compared to the other.

In some examples, the plurality of descriptors are (or can include one or more descriptors) of a second descriptor type of a plurality of descriptor types based on the image not being a keyframe. The second descriptor type can have a lower complexity than at least a first descriptor type of the plurality of descriptor types. For instance, the C1 descriptors described with respect to FIGS. 4A-4B and FIG. 5 can be examples of the second descriptor type. To associate the plurality of features with the map of the environment, the second set of one or more processors can perform feature tracking based on the plurality of descriptors (or the one or more descriptors) of the second descriptor type. Due to their lower complexity compared to descriptors of the first descriptor type, the descriptors of the second descriptor type can include less information about the feature and/or the surroundings of the feature than descriptors of the first descriptor type. In some cases, feature tracking involves frame to frame matching from one frame to an immediately following frame, or a frame that is just a few frames after the initial frame. A feature that is depicted in two frames captured at similar times is likely to be depicted as captured from a similar pose (e.g., angle and/or orientation and/or position), and therefore the feature can be matched by a frame to frame matcher 450 and/or descriptor matcher 435A-435B and/or feature tracking engine 320 even if the descriptor does not include that much information about the feature.

In some examples, to associate the plurality of features with the map of the environment, the second set of one or more processors can determine a location of a first feature of the plurality of features in the environment based on tracking at least the subset of the plurality of features. The second set of one or more processors can update the map of the environment based on the location of the first feature. For instance, updating of the map can be performed by the mapping engine 330 of FIG. 3, the SLAM engine 465 of FIG. 4A and/or FIG. 4B, or a combination thereof. Updating the map of the environment based on the location of the first feature can include adding the location of the first feature to the map. For instance, the added location may be stored and/or communicated as part of a new map slice 375 of the map of the environment. Updating the map of the environment based on the location of the first feature can include modifying a prior location of the first feature in the map based on the location of the first feature. For instance, the modified location may be stored and/or communicated as part of an updated, revised, and/or modified map slice 375 of the map of the environment.

The second set of one or more processors can determine a pose of the apparatus (of the image processing system) within the environment based on associating the plurality of features with a map of the environment. The pose of the apparatus (of the image processing system) within the environment can include a location of the apparatus, a pitch of the apparatus, a roll of the apparatus, a yaw of the apparatus, or a combination thereof. Similarly, the second set of one or more processors can determine a pose of the image sensor within the environment based on associating the plurality of features with a map of the environment. The pose of the image sensor within the environment can include a location of the image sensor, a pitch of the image sensor, a roll of the image sensor, a yaw of the image sensor, or a combination thereof. For instance, determining the pose of the apparatus (of the image processing system) and/or the image sensor can be performed by the VIO tracker 315 of FIG. 3, the mapping engine 330 of FIG. 3, the relocalization engine 355 of FIG. 3, the SLAM engine 465 of FIG. 4A and/or FIG. 4B, or a combination thereof. The pose 385 of FIG. 3 can be an example of the pose of the apparatus (of the image processing system) and/or the image sensor.

In some examples, the first set of one or more processors can receive a second image of the environment captured by a second image sensor contemporaneously with capture of the image by the image sensor. The first set of one or more processors can identify a second plurality of features depicted in the second image. The first set of one or more processors can generate a second plurality of descriptors corresponding to the second plurality of features. The first set of one or more processors can send the second plurality of descriptors to the second set of one or more processors. The second set of one or more processors can receive the second plurality of descriptors from the first set of one or more processors. For instance, if the image received at operation 1005 is an image in the sensor data 480A captured by the sensor 405A of FIG. 4A and/or FIG. 4B, then the second image can be an image in the sensor data 480B captured by the sensor 405B of FIG. 4A and/or FIG. 4B. If the image received at operation 1005 is an image captured by the first camera 730A of FIG. 7A and/or FIG. 7B, then the second image can be an image captured by the second camera 730B of FIG. 7A and/or FIG. 7B. If the image received at operation 1005 is an image captured by the first camera 830A of FIG. 8A and/or FIG. 8B, then the second image can be an image captured by the second camera 830B of FIG. 8A and/or FIG. 8B. If the image received at operation 1005 is an image captured by the first camera 930A of FIG. 9A, then the second image can be an image captured by the second camera 930B of FIG. 9A. If the image received at operation 1005 is an image captured by the third camera 930C of FIG. 9B, then the second image can be an image captured by the fourth camera 930D of FIG. 9B. The second set of one or more processors can perform stereo matching based on the plurality of descriptors and the second plurality of descriptors. In one illustrative example, the stereo matching may be performed by the stereo matcher 455 of the analysis engine 440 of the tracking system 400A of FIG. 4A and/or the tracking system 400B of FIG. 4B. Performing stereo matching based on the plurality of descriptors and the second plurality of descriptors can include searching along an epipolar line, matching against corners detected along an epipolar line, other stereo matching operations, or a combination thereof.

In some examples, the second set of one or more processors can store a second subset of the plurality of descriptors for a second subset of the plurality of features based on the second subset of the plurality of descriptors representing a different observation viewpoint of the second subset of the plurality of features than any prior stored observation viewpoint of the second subset of the plurality of features. For instance, the second subset of the plurality of descriptors may be extracted from keyframes. The second set of one or more processors can delete a remainder of the plurality of descriptors other than the second subset of the plurality of descriptors. The remainder can include one or more descriptors. In one illustrative example, the first set of one or more processors can generate C2 descriptors 525A for frame 510C of FIG. 5, C2 descriptors 525B for frame 510G of FIG. 5, C2 descriptors 525C for frame 510K of FIGS. 5, and C2 descriptors for frame 510M of FIG. 5. The second set of one or more processors can determine that frame 510M of FIG. 5 is not a keyframe, and therefore can delete or otherwise discard the C2 descriptors generated for frame 510M. The second set of one or more processors can determine that frame 510C and frame 510G of FIG. 5 are captured from similar observation viewpoints, while frame 510K is captured from a substantially different observation viewpoint than frame 510C and frame 510G. The second set of one or more processors therefore can delete or otherwise discard either the C2 descriptors 525A for frame 510C or the C2 descriptors 525B for frame 510G of FIG. 5, since the observation viewpoints for those frames are similar and the benefit of keeping both descriptors is minimal. The second set of one or more processors can store the C2 descriptors 525C for frame 510K of FIG. 5, since frame 510K depicts the feature from a different viewpoint than other C2 descriptors. While the example above is specific to C2 descriptors, the same process can be used for C1 descriptors, or for all descriptors. For example, the second set of one or more processors can choose to store only descriptors for depictions of a feature where the observation viewpoints are different enough that the differences meet or exceed one or more thresholds (e.g., observation viewpoint differs by at least a predetermined threshold distance and/or a predetermined threshold angle). The second set of one or more processors can choose to delete or otherwise discard descriptors for depictions of a feature where the observation viewpoints are similar enough that the differences are less than one or more thresholds (e.g., observation viewpoint differs by at least a predetermined threshold distance and/or a predetermined threshold angle).

In some examples, the second set of one or more processors can identify a plurality of feature-specific descriptors for a first feature of the plurality of features. The plurality of descriptors can include one of the plurality of feature-specific descriptors for the first feature. The second set of one or more processors can determine a mean descriptor of the first feature based on a mean of the plurality of feature-specific descriptors for the first feature. Use of this mean descriptor can simplify the map, for instance if the map includes descriptors for a cluster of features that are very close to one another can more efficiently be treated as a single feature. In an illustrative example, a first feature can be depicted in every single one of the frames 510A-510N of FIG. 5. Rather than storing 13 separate C1 descriptors (e.g., in the C1 descriptors 520A-520N) for the first feature as depicted in the different frames 510A-510N, the second set of one or more processors can determine a mean C1 descriptor for the first feature based on a mean of the 13 separate C1 descriptors of the first feature. Rather than storing 3 separate C2 descriptors (e.g., in the C2 descriptors 525A-525C) for the first feature as depicted in each of the keyframes 515A-515C, the second set of one or more processors can determine a mean C2 descriptor for the first feature based on a mean of the 3 separate C2 descriptors of the first feature. The second set of one or more processors need not be limited to feature descriptors of a specific descriptor type, and can determine a mean descriptor based on a mean of both C1 descriptors and C2 descriptors of the first feature.

The process 1000 illustrated in FIG. 10 may also include any operation discussed illustrated in, or discussed with respect to, the image capture and processing system 100, the image capture device 105A, the image processing device 105B, the XR system, the SLAM system 300, the tracking system 400A, the tracking system 400B, or a combination thereof. The image processing technique of FIG. 10 may represent at least some of the operations of an image capture and processing system 100, an image capture device 105A, an image processing device 105B, an XR system 200, a SLAM system 300, a tracking system 400A, a tracking system 400B, an unmanned ground vehicle (UGV) 710, an unmanned aerial vehicle (UAV) 720, a head-mounted display (HMD) 810, a mobile device 950, a computing system 1100, or a combination thereof.

In some cases, at least a subset of the techniques illustrated by the process 1000 may be performed remotely by one or more network servers of a cloud service. In some examples, the processes described herein (e.g., process 1000 and/or other process(es) described herein) may be performed by a computing device or apparatus. In some examples, the process 1000 can be performed by the image capture device 105A of FIG. 1. In some examples, the process 1000 can be performed by the image processing device 105B of FIG. 1. The process 1000 can also be performed by the image capture and processing system 100 of FIG. 1. The process 1000 can also be performed by the XR device of FIG. 2, the SLAM system 300 of FIG. 3, the tracking system 400A of FIG. 4A, the tracking system 400B of FIG. 4B, the unmanned ground vehicle (UGV) 710 of FIG. 7A, the unmanned aerial vehicle (UAV) 720 of FIG. 7B, the head-mounted display (HMD) 810 of FIGS. 8A-8B, the mobile device 950 of FIGS. 9A-9B, a variation thereof, or a combination thereof. The process 1000 can also be performed by a computing device with the architecture of the computing system 1100 shown in FIG. 11. The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 1000. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Figure 11:
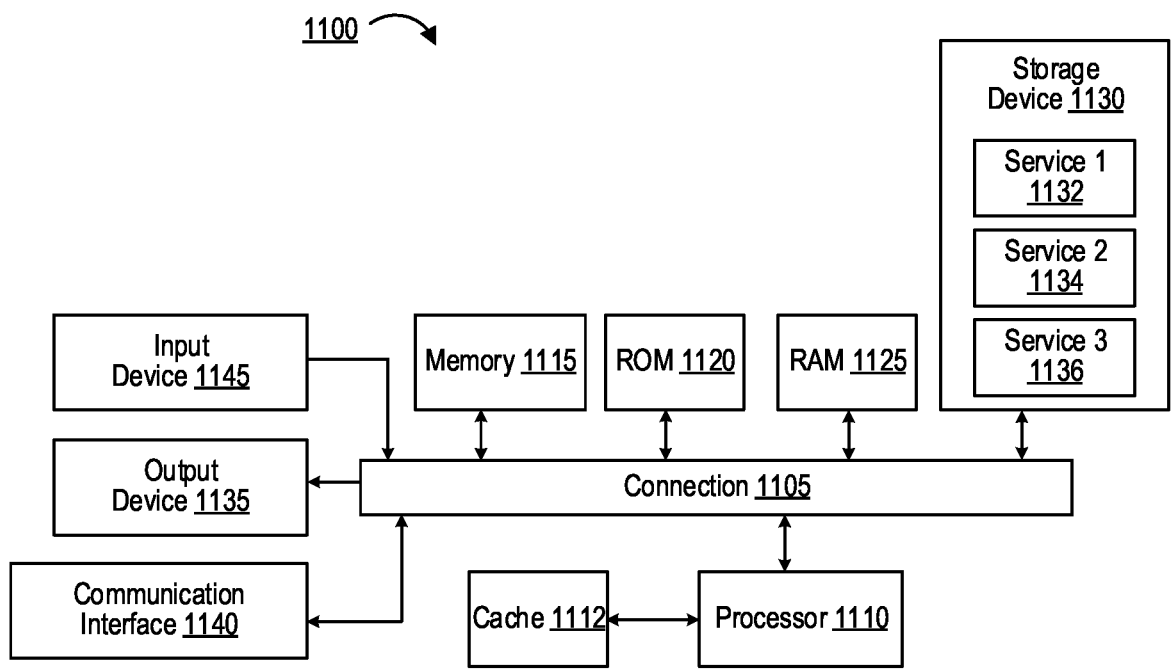
FIG. 11 is a diagram illustrating an example of a system for implementing certain aspects of the present technology.

The processes illustrated by block diagrams in FIG. 1 (of image capture and processing system 100), FIG. 2 (of XR system 200), FIG. 3 (of SLAM system 300), FIG. 4A (of tracking system 400A), FIG. 4B (of tracking system 400B), and FIG. 11 (of system 1100) and the flow diagram illustrating process 1000 are illustrative of, or organized as, logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes illustrated by block diagrams 100, 200, 300, 400A, 400B, and 1100 and the flow diagram illustrating process 1000 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 11 is a diagram illustrating an example of a system for implementing certain aspects of the present technology. In particular, FIG. 11 illustrates an example of computing system 1100, which can be for example any computing device making up the image capture and processing system 100, the image capture device 105A, the image processing device 105B, the XR system, the SLAM system 300, the tracking system 400A, the tracking system 400B a remote computing system, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/Re- RAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for image processing, the apparatus comprising: a memory; and a first set of one or more processors configured to: identify a plurality of features depicted in an image of an environment captured by an image sensor; generate a plurality of descriptors corresponding to the plurality of features; and send the plurality of descriptors to a second set of one or more processors, the second set of one or more processors configured to: receive the plurality of descriptors from the first set of one or more processors; and associate the plurality of features with a map of the environment based on at least a subset of the plurality of descriptors.

Aspect 2: The apparatus of Aspect 1, wherein, to associate the plurality of features with the map of the environment, the second set of one or more processors are configured to track at least a subset of the plurality of features based on at least the subset of the plurality of descriptors and feature information corresponding to one or more additional images of the environment.

Aspect 3: The apparatus of Aspect 2, wherein the feature information corresponding to the one or more additional images of the environment includes one or more other descriptors for at least the subset of the plurality of features, the one or more other descriptors based on one or more depictions of at least the subset of the plurality of features in the one or more additional images.

Aspect 4: The apparatus of any of Aspects 2 to 3, wherein the first set of one or more processors are configured to generate at least one of the one or more other descriptors in response to receipt of at least one of the one or more additional images.

Aspect 5: The apparatus of any of Aspects 1 to 4, wherein the first set of one or more processors are configured to: identify feature locations of the plurality of features; and send the feature locations to the second set of one or more processors, wherein the second set of one or more processors are configured to receive the feature locations from the first set of one or more processors.

Aspect 6: The apparatus of Aspect 5, wherein, to associate the plurality of features with the map of the environment, the second set of one or more processors are configured to associate the plurality of features with the map of the environment based on the feature locations.

Aspect 7: The apparatus of any of Aspects 5 to 6, wherein the plurality of features includes a first feature, wherein the second set of one or more processors are configured to generate a predicted location of the first feature based on one or more additional images that depict the first feature and send the predicted location of the first feature to the first set of one or more processors, wherein, to identify the feature locations, the first set of one or more processors are configured to identify a first feature location of the first feature based on the predicted location of the first feature.

Aspect 8: The apparatus of any of Aspects 5 to 7, wherein the plurality of features includes a first feature, wherein the second set of one or more processors are configured to identify a predicted location of the first feature based on one or more stored descriptors corresponding to the first feature stored in the map of the environment and send the predicted location of the first feature to the first set of one or more processors, wherein, to identify the feature locations, the first set of one or more processors are configured to identify a first feature location of the first feature based on the predicted location of the first feature.

Aspect 9: The apparatus of any of Aspects 1 to 8, wherein the subset of the plurality of features includes a first feature, wherein the second set of one or more processors are configured to send a first feature descriptor of the first feature to the first set of one or more processors, the first feature descriptor based on another image depicting the first feature, and wherein, to identify the feature locations, the first set of one or more processors are configured to identify a first feature location of the first feature based on the first feature descriptor of the first feature.

Aspect 10: The apparatus of any of Aspects 1 to 9, wherein the plurality of descriptors include one or more descriptors of a first descriptor type of a plurality of descriptor types based on the image being a keyframe, the first descriptor type having a higher complexity than at least a second descriptor type of the plurality of descriptor types.

Aspect 11: The apparatus of any of Aspects 1 to 10, wherein, to associate the plurality of features with the map of the environment, the second set of one or more processors are configured to perform relocalization based on the one or more descriptors of the first descriptor type.

Aspect 12: The apparatus of any of Aspects 1 to 11, wherein the plurality of descriptors are of a second descriptor type of a plurality of descriptor types based on the image not being a keyframe, the second descriptor type having a lower complexity than at least a first descriptor type of the plurality of descriptor types.

Aspect 13: The apparatus of any of Aspects 1 to 12, wherein, to associate the plurality of features with the map of the environment, the second set of one or more processors are configured to perform feature tracking based on the plurality of descriptors of the second descriptor type.

Aspect 14: The apparatus of any of Aspects 1 to 13, wherein the second set of one or more processors are configured to: determine a location of a first feature of the plurality of features in the environment based on tracking at least the subset of the plurality of features; and update the map of the environment based on the location of the first feature.

Aspect 15: The apparatus of Aspect 14, wherein, to update the map of the environment based on the location of the first feature, the second set of one or more processors are configured to add the location of the first feature to the map.

Aspect 16: The apparatus of any of Aspects 14 to 15, wherein, to update the map of the environment based on the location of the first feature, the second set of one or more processors are configured to modify a prior location of the first feature in the map based on the location of the first feature.

Aspect 17: The apparatus of any of Aspects 1 to 16, wherein the second set of one or more processors are configured to: determine a pose of the apparatus within the environment based on associating the plurality of features with the map of the environment, wherein the pose of the apparatus within the environment includes at least one of a location of the apparatus, a pitch of the apparatus, a roll of the apparatus, and a yaw of the apparatus.

Aspect 18: The apparatus of any of Aspects 1 to 17, wherein the first set of one or more processors are configured to: receive a second image of the environment captured by a second image sensor contemporaneously with capture of the image by the image sensor; identify a second plurality of features depicted in the second image; generate a second plurality of descriptors corresponding to the second plurality of features; and send the second plurality of descriptors to the second set of one or more processors; wherein the second set of one or more processors are configured to: receive the second plurality of descriptors from the first set of one or more processors; and perform stereo matching based on the plurality of descriptors and the second plurality of descriptors.

Aspect 19: The apparatus of any of Aspects 1 to 18, wherein the second set of one or more processors are configured to: store a second subset of the plurality of descriptors for a second subset of the plurality of features based on the second subset of the plurality of descriptors representing a different observation viewpoint of the second subset of the plurality of features than any prior stored observation viewpoint of the second subset of the plurality of features; and delete a remainder of the plurality of descriptors other than the second subset of the plurality of descriptors.

Aspect 20: The apparatus of any of Aspects 1 to 19, wherein the second set of one or more processors are configured to: identify a plurality of feature-specific descriptors for a first feature of the plurality of features, wherein the plurality of descriptors includes one of the plurality of feature-specific descriptors for the first feature; and determine a mean descriptor of the first feature based on a mean of the plurality of feature-specific descriptors for the first feature.

Aspect 21: The apparatus of any of Aspects 1 to 20, wherein the second set of one or more processors have a higher average clock speed than the first set of one or more processors.

Aspect 22: The apparatus of any of Aspects 1 to 21, wherein the second set of one or more processors uses power at a higher rate than the first set of one or more processors.

Aspect 23: The apparatus of any of Aspects 1 to 22, further comprising: the image sensor.

Aspect 24: The apparatus of any of Aspects 1 to 23, further comprising: the second set of one or more processors.

Aspect 25: The apparatus of any of Aspects 1 to 24, wherein, to send the plurality of descriptors to the second set of one or more processors, the first set of one or more processors sends the plurality of descriptors to the second set of one or more processors over a wireless connection; and wherein, to receive the plurality of descriptors from the first set of one or more processors, the second set of one or more processors receive the plurality of descriptors from the first set of one or more processors over the wireless connection.

Aspect 26: The apparatus of any of Aspects 1 to 25, wherein, to send the plurality of descriptors to the second set of one or more processors, the first set of one or more processors sends the plurality of descriptors to the second set of one or more processors over an electrical connection; and wherein, to receive the plurality of descriptors from the first set of one or more processors, the second set of one or more processors receive the plurality of descriptors from the first set of one or more processors over the electrical connection.

Aspect 27: A method of image processing, the method comprising: receiving, at a first set of one or more processors, an image of an environment captured by an image sensor; identifying, by the first set of one or more processors, a plurality of features depicted in the image; generating, by the first set of one or more processors, a plurality of descriptors corresponding to the plurality of features; sending the plurality of descriptors from the first set of one or more processors to a second set of one or more processors; receiving, by the second set of one or more processors, the plurality of descriptors from the first set of one or more processors; and associating, by the second set of one or more processors, the plurality of features relative to a map of the environment based on at least a subset of the plurality of descriptors.

Aspect 28: The method of Aspect 27, wherein associating the plurality of features with the map of the environment includes tracking at least a subset of the plurality of features based on at least the subset of the plurality of descriptors and feature information corresponding to one or more additional images of the environment.

Aspect 29: The method of Aspect 28, wherein the feature information corresponding to the one or more additional images of the environment includes one or more other descriptors for at least the subset of the plurality of features, the one or more other descriptors based on one or more depictions of at least the subset of the plurality of features in the one or more additional images.

Aspect 30: The method of any of Aspects 28 to 29, further comprising: generating, by the first set of one or more processors, at least one of the one or more other descriptors in response to receipt of at least one of the one or more additional images.

Aspect 31: The method of any of Aspects 27 to 30, further comprising: identifying, by the first set of one or more processors, feature locations of the plurality of features; and sending the feature locations from the first set of one or more processors to the second set of one or more processors, wherein the second set of one or more processors are configured to receive the feature locations from the first set of one or more processors, wherein associating the plurality of features with the map of the environment is based on the feature locations.

Aspect 32: The method of Aspect 31, wherein associating the plurality of features with the map of the environment includes associating the plurality of features with the map of the environment based on the feature locations.

Aspect 33: The method of any of Aspects 31 to 32, further comprising: identifying, by the second set of one or more processors, a predicted location of a first feature of the plurality of features based on one or more stored descriptors corresponding to the first feature stored in the map of the environment; and sending the predicted location of the first feature from the second set of one or more processors to the first set of one or more processors, wherein identifying the feature locations by the first set of one or more processors includes identifying a first feature location of the first feature based on the predicted location of the first feature.

Aspect 34: The method of any of Aspects 31 to 33, wherein the plurality of features includes a first feature, wherein the second set of one or more processors are configured to send a first feature descriptor of the first feature to the first set of one or more processors, the first feature descriptor based on another image depicting the first feature, and wherein identifying the feature locations includes identifying a first feature location of the first feature based on the first feature descriptor of the first feature.

Aspect 35: The method of any of Aspects 27 to 34, wherein the plurality of descriptors include one or more descriptors of a first descriptor type of a plurality of descriptor types based on the image being a keyframe, the first descriptor type having a higher complexity than at least a second descriptor type of the plurality of descriptor types.

Aspect 36: The method of any of Aspects 27 to 35, wherein associating the plurality of features with the map of the environment includes performing relocalization based on the one or more descriptors of the first descriptor type.

Aspect 37: The method of any of Aspects 27 to 36, wherein the plurality of descriptors are of a second descriptor type of a plurality of descriptor types based on the image not being a keyframe, the second descriptor type having a lower complexity than at least a first descriptor type of the plurality of descriptor types.

Aspect 38: The method of any of Aspects 27 to 37, wherein associating the plurality of features with the map of the environment includes performing feature tracking based on the plurality of descriptors of the second descriptor type.

Aspect 39: The method of any of Aspects 27 to 38, wherein associating the plurality of features with the map of the environment includes: determining a location of a first feature of the plurality of features in the environment based on tracking at least the subset of the plurality of features; and updating the map of the environment based on the location of the first feature.

Aspect 40: The method of any of Aspect 39, wherein updating the map of the environment based on the location of the first feature includes adding the location of the first feature to the map.

Aspect 41: The method of any of Aspects 39 to 40, wherein updating the map of the environment based on the location of the first feature includes modifying a prior location of the first feature in the map based on the location of the first feature.

Aspect 42: The method of any of Aspects 27 to 41, further comprising: determining, by the second set of one or more processors, a pose of the image sensor within the environment based on associating the plurality of features with the map of the environment, wherein the pose of the image sensor within the environment includes at least one of a location of the image sensor, a pitch of the image sensor, a roll of the image sensor, and a yaw of the image sensor.

Aspect 43: The method of any of Aspects 27 to 42, further comprising: receiving, by the first set of one or more processors, a second image of the environment captured by a second image sensor contemporaneously with capture of the image by the image sensor; identifying, by the first set of one or more processors, a second plurality of features depicted in the second image; generating, by the first set of one or more processors, a second plurality of descriptors corresponding to the second plurality of features; sending the second plurality of descriptors from the first set of one or more processors to the second set of one or more processors; receive, by the second set of one or more processors, the second plurality of descriptors from the first set of one or more processors; and performing stereo matching by the second set of one or more processors based on the plurality of descriptors and the second plurality of descriptors.

Aspect 44: The method of any of Aspects 27 to 43, further comprising: storing a second subset of the plurality of descriptors for a second subset of the plurality of features based on the second subset of the plurality of descriptors representing a different observation viewpoint of the second subset of the plurality of features than any prior stored observation viewpoint of the second subset of the plurality of features; and deleting a remainder of the plurality of descriptors other than the second subset of the plurality of descriptors.

Aspect 45: The method of any of Aspects 27 to 44, further comprising: identifying, by the second set of one or more processors, a plurality of feature-specific descriptors for a first feature of the plurality of features, wherein the plurality of descriptors includes one of the plurality of feature-specific descriptors for the first feature; and determining, by the second set of one or more processors, a mean descriptor of the first feature based on a mean of the plurality of feature-specific descriptors for the first feature.

Aspect 46: The method of any of Aspects 27 to 45, wherein the second set of one or more processors have a higher average clock speed than the first set of one or more processors.

Aspect 47: The method of any of Aspects 27 to 46, wherein the second set of one or more processors uses power at a higher rate than the first set of one or more processors.

Aspect 48: The method of any of Aspects 27 to 47, wherein sending the plurality of descriptors from the first set of one or more processors to the second set of one or more processors includes sending the plurality of descriptors from the first set of one or more processors to the second set of one or more processors over a wireless connection, wherein receiving the plurality of descriptors from the first set of one or more processors by the second set of one or more processors includes receiving the plurality of descriptors from the first set of one or more processors by the second set of one or more processors over the wireless connection.

Aspect 49: The method of any of Aspects 27 to 48, wherein sending the plurality of descriptors from the first set of one or more processors to the second set of one or more processors includes sending the plurality of descriptors from the first set of one or more processors to the second set of one or more processors over an electrical connection, wherein receiving the plurality of descriptors from the first set of one or more processors by the second set of one or more processors includes receiving the plurality of descriptors from the first set of one or more processors by the second set of one or more processors over the electrical connection.

What is claimed is:

1. An apparatus for image processing, the apparatus comprising:
 a memory; and
 a first set of one or more processors configured to:
  identify a plurality of features depicted in an image of an environment captured by an image sensor;
  extract information associated with the plurality of features to generate a plurality of descriptors corresponding to the plurality of features, wherein an amount of the information extracted to generate the plurality of descriptors is based on whether the image is a keyframe; and
  send the plurality of descriptors to a second set of one or more processors over an interface, wherein bandwidth usage of the interface is based on whether the image is the keyframe, the second set of one or more processors configured to:
   receive the plurality of descriptors from the first set of one or more processors; and
   associate the plurality of features with a map of the environment based on at least a subset of the plurality of descriptors.

2. The apparatus of claim 1, wherein, to associate the plurality of features with the map of the environment, the second set of one or more processors are configured to track at least a subset of the plurality of features based on at least the subset of the plurality of descriptors and feature information corresponding to one or more additional images of the environment.

3. The apparatus of claim 2, wherein the feature information corresponding to the one or more additional images of the environment includes one or more other descriptors for at least the subset of the plurality of features, the one or more other descriptors based on one or more depictions of at least the subset of the plurality of features in the one or more additional images.

4. The apparatus of claim 3, wherein the first set of one or more processors are configured to generate at least one of the one or more other descriptors in response to receipt of at least one of the one or more additional images.

5. The apparatus of claim 1, wherein the first set of one or more processors are configured to:
 identify feature locations of the plurality of features; and
 send the feature locations to the second set of one or more processors, wherein the second set of one or more processors are configured to receive the feature locations from the first set of one or more processors.

6. The apparatus of claim 5, wherein, to associate the plurality of features with the map of the environment, the second set of one or more processors are configured to associate the plurality of features with the map of the environment based on the feature locations.

7. The apparatus of claim 5, wherein the plurality of features includes a first feature, wherein the second set of one or more processors are configured to generate a predicted location of the first feature based on one or more additional images that depict the first feature and send the predicted location of the first feature to the first set of one or more processors, wherein, to identify the feature locations, the first set of one or more processors are configured to identify a first feature location of the first feature based on the predicted location of the first feature.

8. The apparatus of claim 5, wherein the plurality of features includes a first feature, wherein the second set of one or more processors are configured to identify a predicted location of the first feature based on one or more stored descriptors corresponding to the first feature stored in the map of the environment and send the predicted location of the first feature to the first set of one or more processors, wherein, to identify the feature locations, the first set of one or more processors are configured to identify a first feature location of the first feature based on the predicted location of the first feature.

9. The apparatus of claim 5, wherein the plurality of features includes a first feature, wherein the second set of one or more processors are configured to send a first feature descriptor of the first feature to the first set of one or more processors, the first feature descriptor based on another image depicting the first feature, and wherein, to identify the feature locations, the first set of one or more processors are configured to identify a first feature location of the first feature based on the first feature descriptor of the first feature.

10. The apparatus of claim 1, wherein the plurality of descriptors include one or more descriptors of a first descriptor type of a plurality of descriptor types based on the image being the keyframe, the first descriptor type having a higher complexity than at least a second descriptor type of the plurality of descriptor types.

11. The apparatus of claim 10, wherein, to associate the plurality of features with the map of the environment, the second set of one or more processors are configured to perform relocalization based on the one or more descriptors of the first descriptor type.

12. The apparatus of claim 1, wherein the plurality of descriptors are of a second descriptor type of a plurality of descriptor types based on the image not being the keyframe, the second descriptor type having a lower complexity than at least a first descriptor type of the plurality of descriptor types.

13. The apparatus of claim 12, wherein, to associate the plurality of features with the map of the environment, the second set of one or more processors are configured to perform feature tracking based on the plurality of descriptors of the second descriptor type.

14. The apparatus of claim 1, wherein, to associate the plurality of features with the map of the environment, the second set of one or more processors are configured to:
determine a location of a first feature of the plurality of features in the environment based on tracking at least the subset of the plurality of features; and
update the map of the environment based on the location of the first feature.

15. The apparatus of claim 14, wherein, to update the map of the environment based on the location of the first feature, the second set of one or more processors are configured to add the location of the first feature to the map.

16. The apparatus of claim 14, wherein, to update the map of the environment based on the location of the first feature, the second set of one or more processors are configured to modify a prior location of the first feature in the map based on the location of the first feature.

17. The apparatus of claim 1, wherein the second set of one or more processors are configured to:
determine a pose of the apparatus within the environment based on associating the plurality of features with the map of the environment, wherein the pose of the apparatus within the environment includes at least one of a location of the apparatus, a pitch of the apparatus, a roll of the apparatus, and a yaw of the apparatus.

18. The apparatus of claim 1, wherein the first set of one or more processors are configured to:

receive a second image of the environment captured by a second image sensor contemporaneously with capture of the image by the image sensor;
identify a second plurality of features depicted in the second image;
generate a second plurality of descriptors corresponding to the second plurality of features; and
send the second plurality of descriptors to the second set of one or more processors;
wherein the second set of one or more processors are configured to:
receive the second plurality of descriptors from the first set of one or more processors; and
perform stereo matching based on the plurality of descriptors and the second plurality of descriptors and based on a relative positioning between the image sensor and the second image sensor.

19. The apparatus of claim 1, wherein the second set of one or more processors are configured to:
store a second subset of the plurality of descriptors for a second subset of the plurality of features based on the second subset of the plurality of descriptors representing a different observation viewpoint of the second subset of the plurality of features than any prior stored observation viewpoint of the second subset of the plurality of features; and
delete a remainder of the plurality of descriptors other than the second subset of the plurality of descriptors.

20. The apparatus of claim 1, wherein the second set of one or more processors are configured to:
identify a plurality of feature-specific descriptors for a first feature of the plurality of features, wherein the plurality of descriptors includes one of the plurality of feature-specific descriptors for the first feature; and
determine a mean descriptor of the first feature based on a mean of the plurality of feature-specific descriptors for the first feature.

21. The apparatus of claim 1, wherein the second set of one or more processors has a higher average clock speed than the first set of one or more processors.

22. The apparatus of claim 1, wherein the second set of one or more processors uses power at a higher rate than the first set of one or more processors.

23. The apparatus of claim 1, further comprising:
the image sensor.

24. The apparatus of claim 1, further comprising:
the second set of one or more processors.

25. The apparatus of claim 1, wherein, to send the plurality of descriptors to the second set of one or more processors, the first set of one or more processors sends the plurality of descriptors to the second set of one or more processors over a wireless connection; and
wherein, to receive the plurality of descriptors from the first set of one or more processors, the second set of one or more processors receive the plurality of descriptors from the first set of one or more processors over the wireless connection.

26. The apparatus of claim 1, wherein, to send the plurality of descriptors to the second set of one or more processors, the first set of one or more processors sends the plurality of descriptors to the second set of one or more processors over an electrical connection; and
wherein, to receive the plurality of descriptors from the first set of one or more processors, the second set of one or more processors receive the plurality of descriptors from the first set of one or more processors over the electrical connection.

27. A method of image processing, the method comprising:
- receiving, by a first set of one or more processors, an image of an environment captured by an image sensor;
- identifying, by the first set of one or more processors, a plurality of features depicted in the image;
- extracting, by the first set of one or more processors, information associated with the plurality of features to generate a plurality of descriptors corresponding to the plurality of features, wherein an amount of the information extracted to generate the plurality of descriptors is based on whether the image is a keyframe;
- sending the plurality of descriptors from the first set of one or more processors to a second set of one or more processors over an interface, wherein bandwidth usage of the interface is based on whether the image is the keyframe;
- receiving, by the second set of one or more processors, the plurality of descriptors from the first set of one or more processors; and
- associating, by the second set of one or more processors, the plurality of features with a map of the environment based on at least a subset of the plurality of descriptors.

28. The method of claim 27, wherein associating the plurality of features relative to the map of the environment includes tracking at least a subset of the plurality of features based on at least the subset of the plurality of descriptors and feature information corresponding to one or more additional images of the environment.

29. The method of claim 27, further comprising:
- identifying, by the first set of one or more processors, feature locations of the plurality of features; and
- sending the feature locations from the first set of one or more processors to the second set of one or more processors, wherein the second set of one or more processors are configured to receive the feature locations from the first set of one or more processors, wherein associating the plurality of features relative to the map of the environment is based on the feature locations.

30. The method of claim 27, further comprising:
- receiving, by the first set of one or more processors, a second image of the environment captured by a second image sensor contemporaneously with capture of the image by the image sensor;
- identifying, by the first set of one or more processors, a second plurality of features depicted in the second image;
- generating, by the first set of one or more processors, a second plurality of descriptors corresponding to the second plurality of features;
- sending the second plurality of descriptors from the first set of one or more processors to the second set of one or more processors;
- receive, by the second set of one or more processors, the second plurality of descriptors from the first set of one or more processors; and
- performing stereo matching by the second set of one or more processors based on the plurality of descriptors and the second plurality of descriptors and based on a relative positioning between the image sensor and the second image sensor.

* * * * *